(12) United States Patent
Ebenhoch et al.

(10) Patent No.: US 7,451,670 B2
(45) Date of Patent: Nov. 18, 2008

(54) MANUALLY CONTROLLED SHIFTING CONVERSION APPARATUS FOR A MULTI-STAGE TRANSMISSION

(75) Inventors: Michael Ebenhoch, Friedrichshafen (DE); Martin Flückiger, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 784 days.

(21) Appl. No.: 10/520,546

(22) PCT Filed: Jul. 9, 2003

(86) PCT No.: PCT/EP03/07434

§ 371 (c)(1),
(2), (4) Date: Jan. 6, 2005

(87) PCT Pub. No.: WO2004/008005

PCT Pub. Date: Jan. 22, 2004

(65) Prior Publication Data

US 2006/0117892 A1    Jun. 8, 2006

(30) Foreign Application Priority Data

Jul. 11, 2002 (DE) ................ 102 31 547

(51) Int. Cl.
*B60K 20/00* (2006.01)
(52) U.S. Cl. ............... 74/473.37; 74/473.36; 74/330
(58) Field of Classification Search ........... 74/473.37, 74/473.36, 340, 330, 331
See application file for complete search history.

(56) References Cited

U.S. PATENT DOCUMENTS

| 4,377,951 | A | | 3/1983 | Magg et al. | |
|---|---|---|---|---|---|
| 5,503,039 | A | | 4/1996 | Bailly et al. | |
| 5,511,437 | A | * | 4/1996 | Braun | 74/331 |
| 5,719,189 | A | * | 2/1998 | Schmidt et al. | 514/649 |
| 5,819,601 | A | * | 10/1998 | Kuhn | 74/745 |
| 6,318,211 | B1 | | 11/2001 | Nitzschke et al. | |
| 6,634,247 | B2 | | 10/2003 | Pels et al. | |
| 6,718,841 | B1 | * | 4/2004 | Schepperle | 74/359 |
| 7,353,726 | B2 | * | 4/2008 | Beer et al. | 74/340 |
| 2003/0121343 | A1 | | 7/2003 | Berger et al. | |

FOREIGN PATENT DOCUMENTS

| DE | 1 625 182 | 7/1970 |
|---|---|---|
| DE | 2 262 892 | 6/1974 |
| DE | 30 00 577 C2 | 1/1983 |
| DE | 35 27 390 A1 | 2/1987 |

(Continued)

*Primary Examiner*—David M Fenstermacher
(74) *Attorney, Agent, or Firm*—Davis Bujold & Daniels, P.L.L.C.

(57) ABSTRACT

A manually controlled shifting conversion apparatus for a multistage transmission having multiple shifting packets wherein gears for successive, non-adjacent gear ratios are located in each shifting packet and gears for successive, adjacent gear ratios are located in different shifting packets. The gears located in each shifting packet are respectively engaged by opposing axial displacements of the shifting packet controlled by a gear shift lever (4). The gear shift level (4) has a shifting pattern wherein the shifting positions of successive gear ratios are located in opposing positions in the shifting pattern.

39 Claims, 17 Drawing Sheets

FOREIGN PATENT DOCUMENTS

| | | |
|---|---|---|
| DE | 41 37 143 A1 | 5/1993 |
| DE | 101 19 748 A1 | 10/2001 |
| DE | 101 33 695 A1 | 3/2002 |
| EP | 1 034 384 B1 | 2/2002 |
| EP | 1 184 597 A2 | 3/2002 |
| FR | 727783 | 6/1932 |
| FR | 2 815 103 | 4/2002 |
| WO | WO-99/28654 | 6/1999 |

* cited by examiner

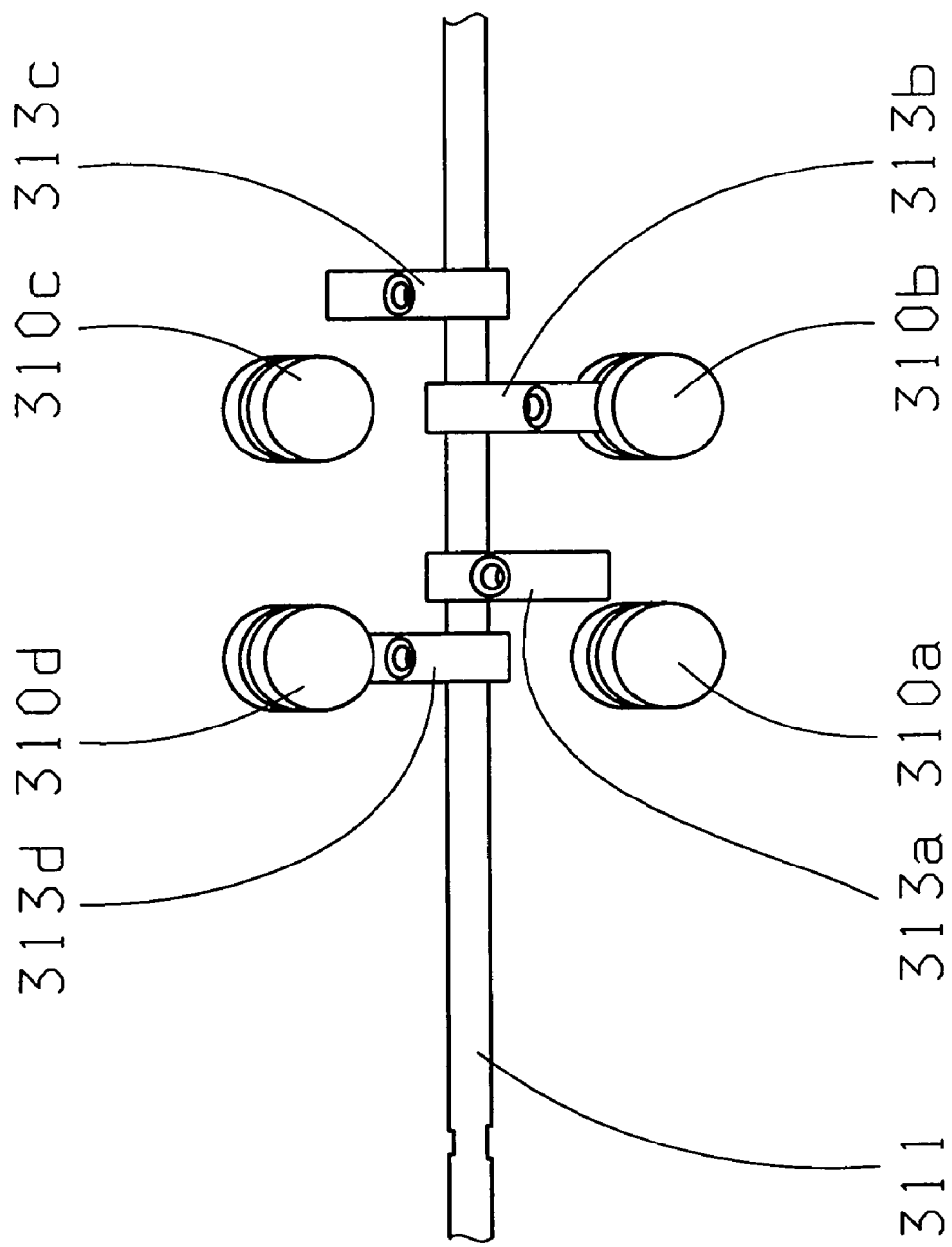

US 7,451,670 B2

MANUALLY CONTROLLED SHIFTING CONVERSION APPARATUS FOR A MULTI-STAGE TRANSMISSION

This application is a national stage completion of PCT/EP2003/007434 filed Jul. 9, 2003 which claims priority from German Application Serial No. 102 31.547.7 filed Jul. 11, 2002

FIELD OF THE INVENTION

The invention concerns a manually controlled shifting conversion apparatus for a multistage transmission having multiple shifting packets wherein gears for successive, non-adjacent gear ratios are located in each shifting packet and gears for successive, adjacent gear ratios are located in different shifting packets and wherein the gears located in each shifting packet are respectively engaged by opposing axial displacements of the shifting packet controlled by a gear shift lever (4) having a shifting pattern wherein the shifting positions of successive gear ratios are located in opposing positions in the shifting pattern.

BACKGROUND OF THE INVENTION

There are already motor vehicle transmissions known, such as disclosed in DE 41 37 143 A1, wherein a multistage, synchronized, extended transmission is described, and wherein, respectively, two gears are assigned to one of the multiple shifting packets. In this case, to the one shifting packet are assigned two gears, such as first and third, or second and fourth, these not being successively following gear ratios. The advantage gained from this is that a shifting system has been created, by which overlapping activations and thereby a lessening of the intervening idle time of a shift is made possible. However, the disadvantage is, that with a conventional manually operated gear shift lever, a transmission with this advantage cannot be shifted, since the usual gear shift lever, which functions in the normal H-configuration, is designed to shift gears which principally follow one another.

Further, a twelve-gear shifting transmission, for a utility vehicle is known, (see EP 10 34 384 B1), wherein the fore-shift group is manually shifted and the main group, i.e. the secondary group is automatically and pneumatically shifted. Pneumatic shifting apparatuses are provided for both the principal and the secondary groups, wherein the desired gear can be correspondingly activated upon selection of shift-paths by means of the manual shifting device. Thereby, the attained shifting program represents a shifting program of a common 6-gear shifting transmission. The disadvantage of this arrangement is, however, that separate, pneumatic shifting apparatuses must be provided, in order to be able to shift the gears in the usual manner in normal shifting pattern.

Further, from the German patent text of the applicant, a shifting device for a motor vehicle transmission has been disclosed by DE 30 00 577, wherein, with one manual gear shift lever, the shifting can again be done in the customary H method. In this case, on the shifting shaft are to be found two shifting finger shafts, whereby, respectively, only one shifting finger controls the four gear stages of the basic transmission. Upon a change from the second into the third shift-path, a shifting valve is activated, which activates the area group. Upon the shifting into the third and fourth shift-paths, then the second shifting finger comes into engagement. Disadvantageous here is the separate actuator of the area group.

DE 35 27 390 A1 discloses a manually shifted, double clutch transmission. In this case, upon actuation of the gear lever in the optional selection path, a shift-sleeve is slidingly displaced. By the activation of the gear shift lever, in a selection path, respectively one clutch of the double shift clutch is closed. Disadvantageous with this shifting device, is a limitation to principally four forward gears, if the shifting takes place when specifically, no foreign power addition can be relied on.

Departing from this point, it is the purpose of the invention to so develop a transmission for a motor vehicle, especially a multistage transmission, wherein at least one, therein located shifting packet possesses no directly successive ratio stages and wherein a manual activation by means of a normal H-shifting pattern is possible.

SUMMARY OF THE INVENTION

The present invention is directed to a manually controlled shifting conversion apparatus for a multistage transmission having multiple shifting packets wherein gears for successive, non-adjacent gear ratios are located in each shifting packet and gears for successive, adjacent gear ratios are located in different shifting packets and wherein the gears located in each shifting packet are respectively engaged by opposing axial displacements of the shifting packet controlled by a gear shift lever (4) having a shifting pattern wherein the shifting positions of successive gear ratios are located in opposing positions in the shifting pattern In each case, as a current application may require, the conversion apparatus can be directly, or indirectly, designed as a connection between the gear shift lever and a shifting packet, wherein no successive gear ratios have been assigned. One embodiment of the invention provides, for example, upon the use of the invention in an omnibus, wherein the gear shift lever is installed in the forward part of the vehicle body and is thus remote from its transmission, which is placed in the back of the vehicle. This requires an indirect formulation of the conversion apparatus, by means of which, the motions of a gear shift lever are transmitted mechanically, with shifting rods, or cables, or even electro-mechanically, pneumatically or even hydraulically. One embodiment of a mechanical conversion apparatus provides the conversion apparatus as being a shifting rod, a cable or wire rope connection. Especially advantageously, possibly a combination of the various embodiments can be used.

An advantage of this embodiment, is that, upon the use of a conventional gear shift lever, with a conventional shifting pattern, or usual shifting linkages, the arrangement of the ratio stages in the motor vehicle is entirely independent thereof.

A further advantageous embodiment provides, that a shifting pattern be assigned to a gear shift lever, by means of which, essentially, neighboring ratio stages are situated opposite to one another.

In accord with another favorable embodiment, provision is made, that the gear shift lever, acting within at least one shift-path, can shift in successive ratio stages of the transmission, whereby at least one of the ratio stages, is shifted, by a shifting packet, which itself has not been assigned two successive ratio changes.

One approved embodiment provides, that each shift-path can serve at least two shifting packets.

In accord with yet another essential feature, provision is made, that by slidingly moving the gear shift lever in a selection shift-path of the shifting pattern, at least two shifting packets can be simultaneously connected to the gear shift lever by means of shifting rods. In a further advantageous embodiment, at least two shifting packets can be simultaneously bound together by shifting extensions. The advantage therein lies in the fact, that in one shift-path, oppositely situated gears need be assigned no neighboring transmission stages. Particularly of advantage is, that the directions of the installation of the shifting packets is such, that the two gears are not required to turn against one another.

In accord with another essential feature, provision is made, that the gear shift lever is connected to a shifting finger shaft, which shaft is axially displaceable by the gear shift lever and can also be pivoted radially. An advantageous embodiment provides, that the gear shift lever can be rigidly affixed to the shifting finger shaft.

In accord with the invention, provision is made, that to the shifting finger shaft is coupled at last one additional shifting finger shaft. A particularly preferred design of the coupling provides coupling the shifting finger shafts by means of toothed gears which are turnably affixed on the shifting finger shafts. By the use of more than two shifting finger shafts, it becomes possible to advantageously have a space-saving placement of the shifting finger shafts in more than one plane. The coupling of different shifting finger shafts allows the essential advantage, that by the connection of a shifting packet with the gear shift lever, the corresponding shift-position in the shifting pattern becomes freely accessible. It can, however, be of advantage, to make the shifting finger shafts so that that may be uncoupled. For instance, uncoupling is possible by the gear shift lever, since the gear shift lever can be drawn or pushed in opposite directions. Again an automatic decoupling thereof could be carried out by a lateral displacement of the gear shift lever along the selection paths of the shift-pattern. This allows even further degrees of freedom for the shifting apparatus, which, for example, can be put to use for preselection or for the shortening of shifting times. In this way, by means of the decoupled shifting finger shaft an existing gear, during a shifting and/or selection movement can be retained in action and by the shifting finger shaft bound to the gear shift lever a group can be changed.

In accord with another essential feature, provision is made, that the shifting finger shafts are so coupled, that a selected movement of the gear shift lever slidingly displaces all shifting finger shafts in parallel and/or one shift movement of the gear shift lever causes neighboring shifting finger shafts to rotate counter to one another. The advantage here is, that a defined shifting direction of the gear shift lever in one shift-path does not limit the direction of rotation of the shifting finger shafts.

The use of only one shifting finger shaft, in a case of conventional shifting apparatuses, allows upon the movement of the gear shift lever, the movement direction of an element affixed to the shifting finger shaft to be in a certain direction, dependent upon a given movement of the gear shift lever. In accord with the invention, provision is made, that one or more shifting fingers may be carried by each shifting finger shaft. The advantage here, is that the shifting finger can be differently constructed. If this is the situation, then it is possible that different ratio relationships of the gear shift lever are realized upon the actuation of various gears. In this way, the torque ratio, which acts upon synchronization is optimized, whereby simpler synchronization elements can be used.

In accord with the arrangement of the ratio-stages of the transmission, provision is made, that in at least one shift-path, at least two shifting fingers on separate shafts engage different shifting rods. Therewith, in accord with the invention, the spatial distance of two shifting packets and their shifting rods are uncoupled from the position of the gear shift lever within the switching compartment. If the shifting packets, which are so placed in gears, which are to be found in a common shift-path, then, to actuate a gear, they must both be slidingly displaced in the same direction by shifting-means. Under these conditions, then, again in accord with the invention, the shifting finger, which is thereby engaged, is provided with an activation direction of the gear shift lever in a reverse sense of the activation of two gears.

In accord with a further essential feature, provision is made, that by the rotation of the shifting finger shaft in one direction of rotation, at least one shifting finger of the one shifting finger shaft is brought out of engagement of one shifting rod and at least one other shifting finger of the other shifting finger shaft pushes the other shift rod. It is particularly of advantage here, that upon the activation of the gear shift lever in a shifting position of a shift-path, only one shifting rod, and thereby only one gear is shifted, without the necessity of sliding the other shifting finger axially, in order to uncouple it from the shifting finger shaft.

Again in accord with the invention, the shifting apparatus is designed in such a manner, that upon the turning of the shifting finger shaft in a reverse-sense direction, at least one shifting finger of the other shifting finger shaft is brought out of engagement with the other shifting rod and at least one shifting finger of the one shifting finger shaft slidingly pushes the other shifting rod.

If the two gears of a shift-path are placed in different shifting packets, and besides this, are to be slidingly displaced for the actuation of the desired gears, then the shifting fingers, which activate the shifting-means, are located on the same shifting finger shaft. In accord with an essential feature, in this way, provision is made, that, by the turning of the shifting finger shaft in one direction of rotation, at least one shifting finger of the one shifting finger shaft is brought out of engagement from one shift rod and at least one other shifting finger of the same shifting finger shaft slides the other shifting rod.

The invention concerns itself, moreover, not only with the activation of the shifting packets, to which non-successive gears are assigned, but much more, the invention permits also the activation of a shifting packet by means of a shifting finger in both directions, whereby, however, by exceeding the possibilities of a conventional shifting apparatus, the placement of the two gears in one shift-path can be exchanged, each in accord with the assignment of the shifting finger to one of the shifting finger shafts.

Further, it can be provided, by the use of a plurality of shifting fingers and especially by a special assignment of a shifting finger to only one (or no) shifting packets, to optimize the contour, preferably the length of the shifting finger, to meet the desired power ratio relationship of the gear to be selected.

For the transmission of the movement of the gear shift lever to the shifting packets dedicated to the ratio stages, there are provided in one embodiment of the invention, shifting-means with at least one toothed segment and a thereto complementary rack.

Alternatively to the above described inversion apparatus, with two shifting finger shafts, the inversion apparatus can just as well consist, essentially, of a shifting finger shaft with a plurality of shift rods, whereby the shifting finger shaft is principally placed at right angles to the shift-rods. This allows, advantageously, the omitting of the previously described necessary transmission of a rotational motion by two shifting finger shafts, the motion being shifted from the first to the second shifting finger shaft, for instance by a gear train.

Advantageously, the shifting rods are normally in two planes on oppositely situated side of the shifting finger shaft. Beyond this, on the shifting finger shaft such shift fingers are provided, as would coact with the shifting grooves in the shifting rods, so that each optional, geometric combination of the shifting fingers with the shifting grooves in the shifting rods, as well as each desired, technically sound movement direction of the shifting rods can be carried out.

The gear shift lever is likewise, as already mentioned, bound rigidly with the shifting finger shaft, so that one motion of the gear shift lever by the driver can be converted into one, direct motion of the shifting finger shaft and therewith of the shifting rod.

In an advantageous manner, the shifting fingers are so arranged on the shifting finger shafts, that the shifting fingers in the neutral position of the gear shift lever do not run perpendicularly to the shifting rods, but rather at an incline to the longitudinal axis thereof.

For the setting of one gear by the activation of the gear shift lever, then the concerned shifting finger is pivotal in its position, which is essentially perpendicular to the shifting rod. Thereby, what is achieved, is that, advantageously, only one shifting finger finds itself engaged with a shifting groove, while the remainder shifting fingers are not engaged with the corresponding shifting elements.

Upon the pivoting of the concerned shifting finger in one direction, then the shifting rod, i.e. the shifting packet, is activated. Upon the pivoting of the shifting finger in the opposite direction, then the shifting finger is free and the shifting rod is not activated, whereby, advantageously, the shifting rod is kinematically coupled with the shifting finger, until, once again, the neutral position is reached.

Particularly advantageous is, in accord with the previously described design of the shifting apparatus, that only one shifting finger for the inclusion and the exclusion of a gear is required.

In an additionally advantageous embodiment, a shifting finger is so located, that it provides for the inclusion and exclusion of two gears. In other words, for instance four gears can be shifted with two shifting fingers.

Instead of the described, slidable shifting rods, a conversion apparatus can also have fixed shifting rods, upon which, advantageously, slidable shifting collars may be placed.

The described shifting apparatus is manually controlled and/or is free of automatic controlling means, so that, for example, an electronic control apparatus for the activation of the shifting apparatus is not required.

The invention concerns further, motor vehicle transmissions, whereby, within such a transmission, at least two non-directly successive ratio stages are assigned to one shifting packet, which, are manually shiftable by a shifting-means, whereby a gear shift lever for the activation of the shifting packet is provided. Further, to the gear shift lever is provided a shifting pattern plate, with which, essentially, the shifting positions of each two, directly successive following gears in the shifting paths lie opposite to one another and wherein a selectable gear within the path can be assigned to different shifting packets.

The invention of the presented updating of the shifting procedure makes it possible, that motor vehicle transmissions, which, up to the present time, could not be manually shifted, can now be so shifted. Furthermore, it is also possible that the gearing of a double clutch transmission, preferably a load carrying transmission, can be converted into a hand shiftable transmission. The essential components of the transmission, (geartrain, housing, inner shift mechanisms) can, thus, be made with the same manufacturing equipment. Therewith, the variant, multifaceted individual components are reduced and therewith the costs are reduced, because of a greater piecework basis. In this way, it is possible, for example, that heavy load transmissions and manually shifted transmissions which may have been automated, can be converted to the basis of only one transmission. Furthermore, it is possible, with one invented shifting apparatus, that group shifting can be reformed into manual shifting, without requiring additional gear shift levers to change into the selection of the various group stages or for selecting external power supplied activations, which can, in accord with the invention, be chosen by one selective movement of the gear shift lever.

BRIEF DESCRIPTION OF THE DRAWINGS

The invention will now be described, by way of example, with reference to the accompanying drawings in which:

FIGS. 13 to 15 show a conversion apparatus of FIG. 12, in various side views.

DETAILED DESCRIPTION OF THE INVENTION

Figure 1:
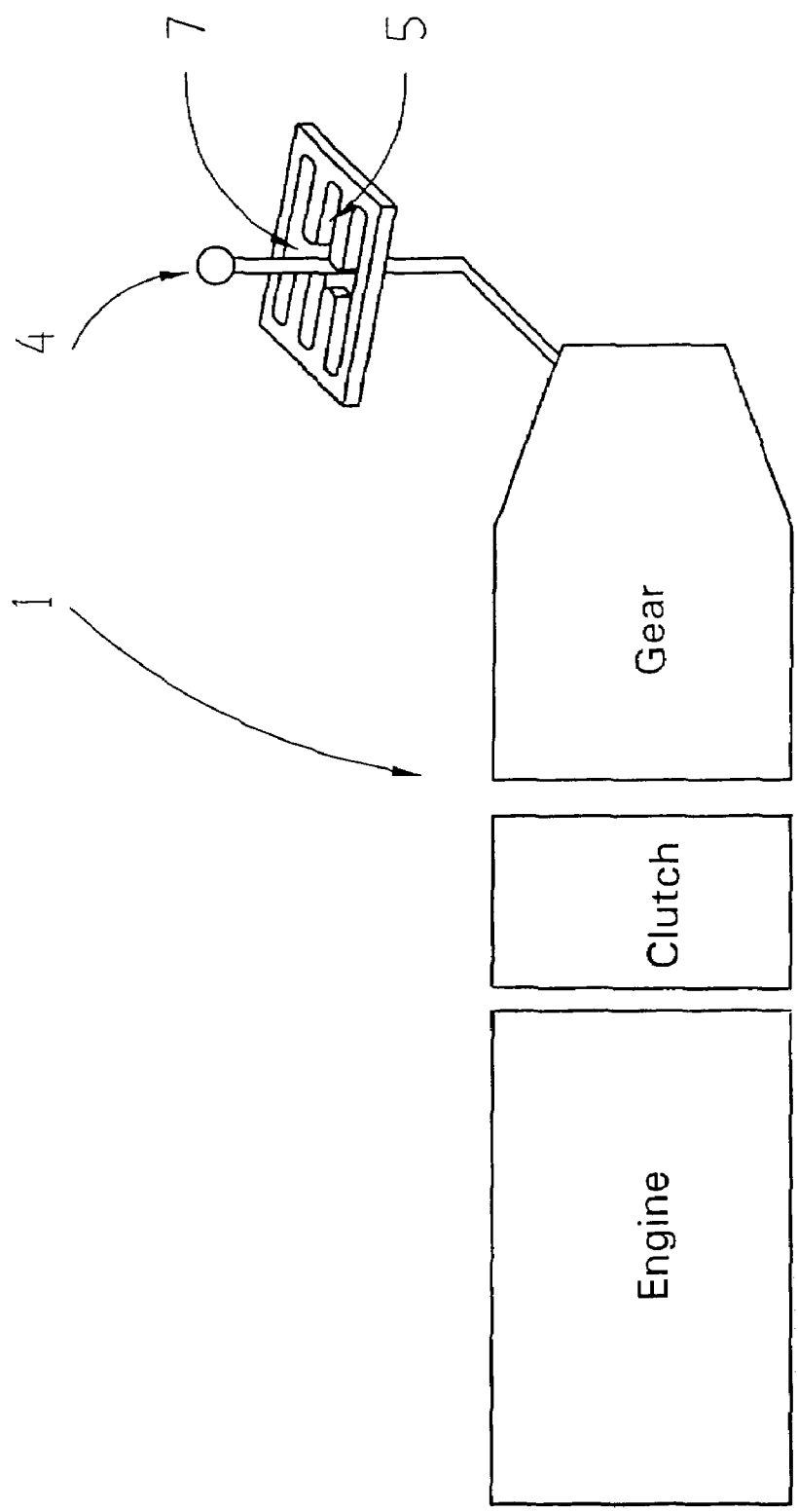
FIG. 1 shows a motor transmission and shifting lever in accord with the state of the technology.

In FIG. 1, is shown a schematic presentation of a motor of a powered vehicle, onto which, in an axial direction, is attached a clutch as well as a transmission 1, in the conventional arrangement of the state of the technology. The transmission 1 is activated by a gear shift lever 4, whereby, in the shown embodiment, this said gear shift lever 4 is guided within the shift-paths 5 and specifically within selected path 7. The gear shift lever 4 is, also in this embodiment, presented with an H shaped shifting pattern. Also, however, other shifting patterns of multiple H design can be employed. This is dependent upon the number of the ratio stages of the thereto belonging motor vehicle transmission 1.

Figure 2A:
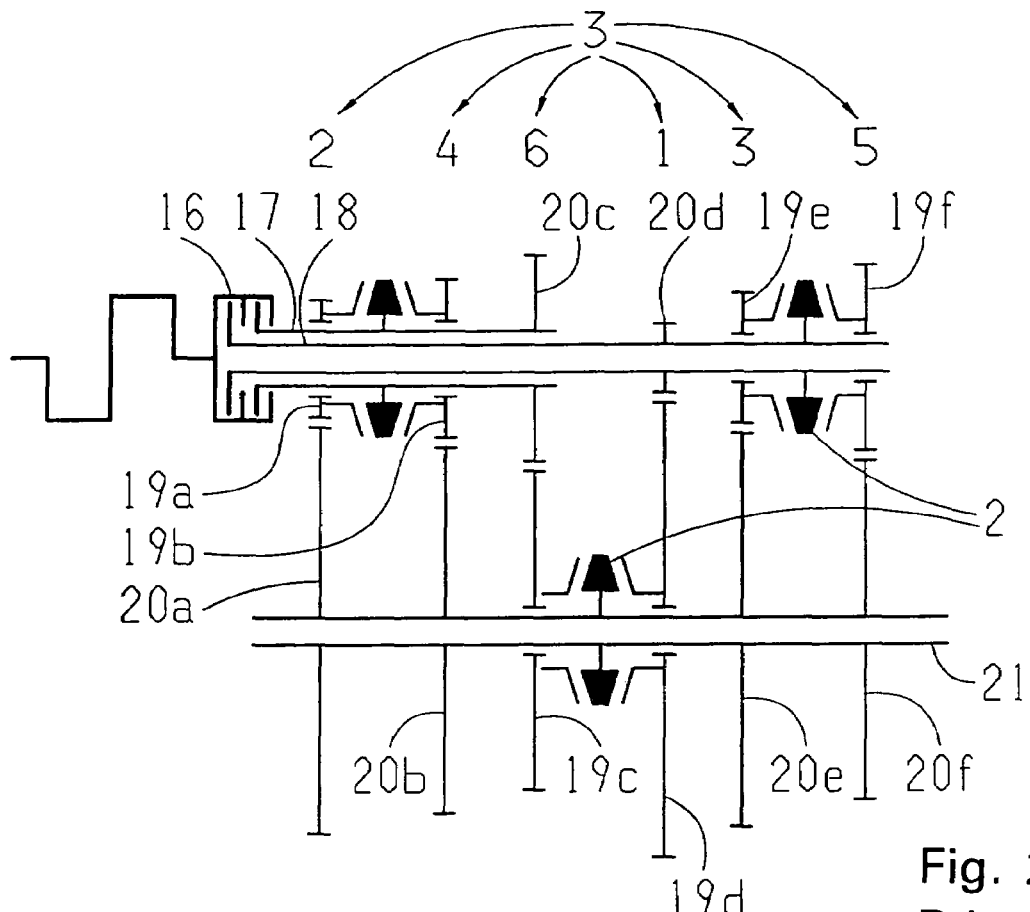
FIG. 2a is an example of a drive string of a load-shifting, double clutch transmission in accord with the state of the technology.

FIG. 2a shows, again in a schematic drawing, the assembled construction of a double-clutch transmission in accord with the state of the technology, and further, the installation of a load shifting system in the driving gear string. In order to achieve heavy duty shifting without an interruption in the delivered traction power, to the transmission is added a double clutch 16. Accompanying this, is respectively connected to the double clutch 16 an input drive shaft of the double clutch transmission. With this, lie the even gears (2', 4', 6'), and the odd gears (1', 3' 5'). These are to be found on a transmission input shaft. The ratio stages of the even gears lie on the hollow shaft 17 and the odd gears are to be found on the solid shaft 18, wherein the solid shaft 18 is circumferentially encompassed by the hollow shaft 17. The ratio stages of the second and the fourth gears are achieved by the free gears 19a and 19b which are carried on the hollow shaft and by the fixed gears 20a, 20b which are bound to the counter shaft 21. The ratio stage of the sixth gear is determined by the fixed gear 20c, which is borne on the hollow shaft 17 and the free gear 19c affixed to the counter shaft 21. The ratio stage of the first gear depends upon the fixed gear 20d, which is seated on the solid shaft 18 and the free gear 19d. The ratio stages of the third and fifth gear stage depend on the free gears 19e, 19f, which are to be found on the solid shaft 18 in combination with the two fixed gears 20e, 20f of the counter shaft 21. A ratio stage of the reverse gear or additional forward gears are not shown. The free gears 19a, 19b of the second and fourth gear stage is assigned to a common shifting packet 2, which can rotatably seat the two free gears 19a, 19b on the hollow shaft 17. The first and the sixth gear stage is likewise assigned to a common shifting packet 2. This shifting packet is seated on the counter shaft 21, is axially slidable, and can rotatably bind the free gears 19c, 19d with the counter shaft 21. The gear stages third and fifth is likewise assigned to a common, axially displaceable shifting packet 2, which can rotatably bind the free gears 19e, 19f with the solid shaft 18. In order to be able to carry out heavy load shifting without loss of traction, the gear stage of the desired gear is engaged immediately before the actual shifting procedure. During the shifting process, there is executed an overlapping shifting of the two clutches of the double clutch 16. When this occurs, then the new clutch of the desired gear is closed, while simultaneously, the old clutch of the former gear is synchronously opened. In this way, the torque transmission of the motor torque placed on the double clutch 16 transfers from the old clutch to the new clutch. Both the control of the double clutch 16 as well as that of the double clutch transmission is carried out automatically. In this case, an automated clutch actuator is provided for the double clutch and the double clutch transmission receives a transmission actuator, which activates the shifting packet 2. The control as well as the upgrade is done by a (not shown) control unit, which can receive input signals, namely a demand for a shift, and the operation of the transmission update and that of the clutch are tuned to one another and accordingly carried out.

Figure 2B:
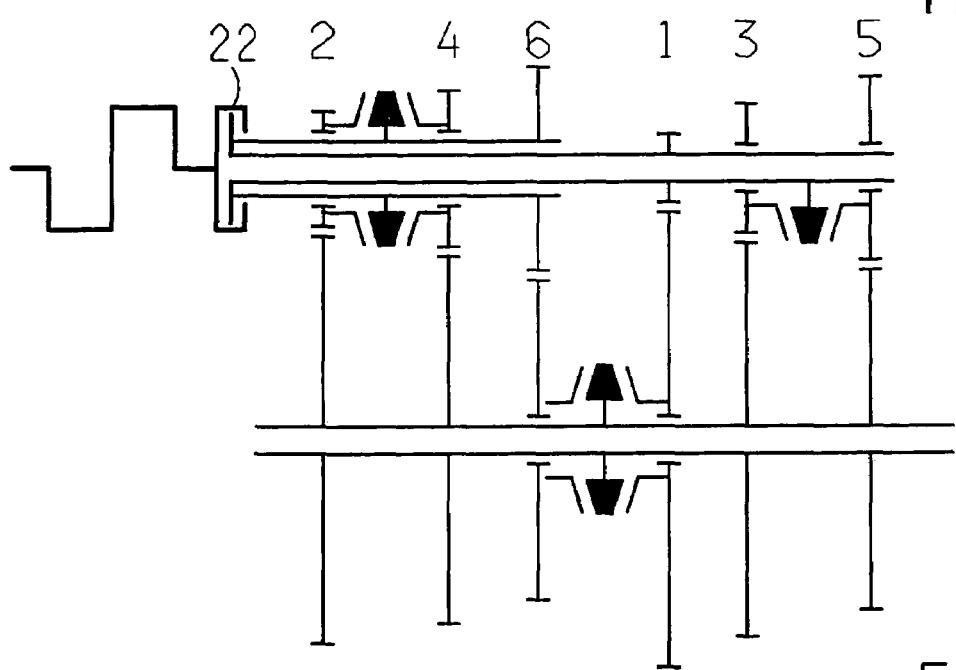
FIG. 2b is an example of a drive string of a manual shift, double clutch gear train in accord with the invention.

In FIG. 2b the same double clutch transmission is presented in a manually operated drive gear string. In this case, between the motor and the transmission is placed a clutch 22 actuated by the driver. The two transmission input drive shafts of the double clutch transmission are both bound with the clutch disk of the clutch 22. A rotatably fixed connection of the two transmission input shafts can be placed both within the single clutch transmission as well as within the double clutch transmission. Further, it would be obvious to the expert, that instead of two transmission input drive shafts, now only one transmission input drive shaft can be used, without the necessity of changing the gear structure of the original double clutch transmission. Upon the use of the invented shifting apparatus, it is now possible, to retain the fundamental arrangement of ratio stages of the double clutch transmission and still be able to shift in a customary manner in a known shifting pattern, in which the neighboring, successive gears essentially are located opposite to one another. The use of a conventional shifting apparatus would require a shifting pattern, which would appear to the driver as unnatural. In this case, the gears 2' and 4' would find themselves oppositely opposed in a path, as well as in a further path, the gears 1' and 6', as well as also in yet another path, the gears 3' and 5', likewise, opposed.

Figure 3:
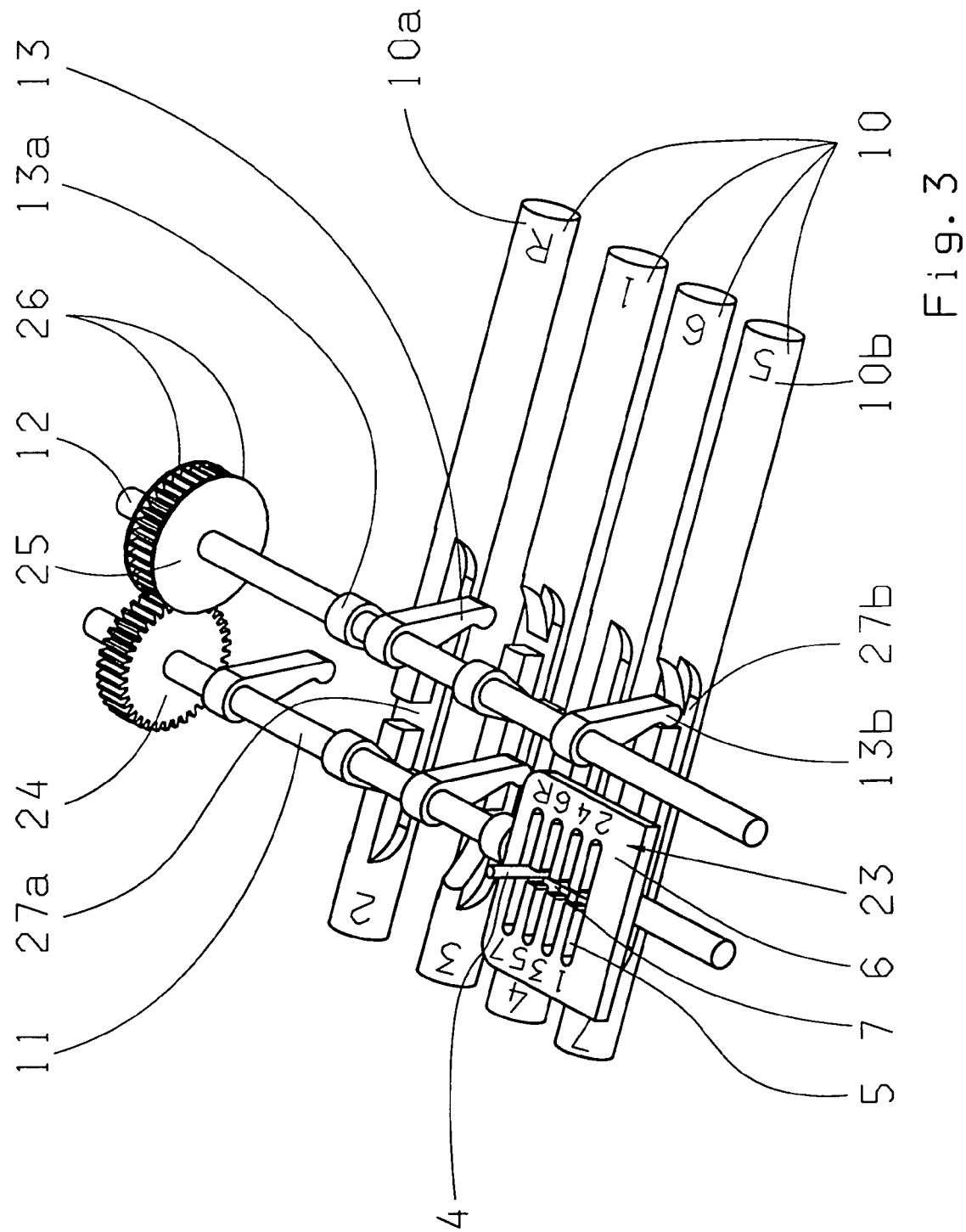
FIG. 3 is an invented conversion apparatus with shifting layout, together with shifting shafts and the thereto belonging selection finger rods.

FIG. 3 shows an invented conversion apparatus 8, however, with a different shifting succession than that of the apparatus shown in FIG. 2b. In this case, the gear shift lever 4 is guided in a shifting compartment 23. The shifting pattern 6 of the shifting compartment 23 consists of four shift-paths 5, which are interconnected by a selection path 7. The gear shift lever 4 is rigidly bound to the shifting finger shaft 11. Parallel to the shifting finger shaft 11 is to be found the shifting finger shaft 12. The shifting finger shafts 11, 12 are coupled together by the gears 24 and 25. In this arrangement, the gear 24 is firmly bound to the shifting finger shaft 11. Likewise, the gear 25 is tightly bound to the shifting finger shaft 12. By the coupling of the two shifting finger shafts 11, 12, by means of the gears 24, 25, there occurs, upon a movement of the gear shift lever 4 in a shift-path 5 a counter rotational turning of the two shifting finger shafts. A movement of the gear shift lever 4 in the selector path 7, occasions a parallel sliding displacement of the two shifting finger shafts 11, 12. In this case, the gear 25 is so designed, that it possesses on both of its side faces a disklike guide element 26, which has a greater radius than does the gear 25 itself. Thereby, the gear 24 of the shifting finger shaft 11 is moved axially. On each of the two shifting finger shafts 11, 12 are located, respectively, four shifting fingers 13, which are rigidly bound with the respective shifting finger shafts 11,12. A choosing of a desired shift-path 5 by means of the gear shift lever 4 brings the corresponding shifting finger 13 into an actionable connection with the to-be-shifted shifting rod 10. In the shifting position shown in FIG. 3, the path of the seventh and the reverse gears have been selected. In this shift-position, the shifting finger 13a is engaged in the shifting rod 10a and the shifting finger 13b is engaged in the shifting rod 10b. A sliding of the gear shift lever 4 in the direction of shifting position of the seventh gear, calls for a reverse rotation of the two shifting fingers 11, 12. The rotating of the shifting finger shaft 12 requires a turning of the two shifting fingers 13a and 13b toward the shifting finger shaft 11. As this is done, the shifting finger 13a pivots upward out of the shifting groove 27a of the shifting rod 10a. The shifting finger 13b, which is engaged in the shifting groove 27b of the shifting rod 10b, is turned under the shifting finger shaft 12 by means of sliding the gear shift lever 4 in the direction of the shifting position of the seventh gear. As this is done, the shifting rod 10b is slidingly displaced in the same direction as the gear shift lever 4 and the seventh gear is attained, by means of a (not shown) shifting packet, which is bound with the shifting rod 10b. A retraction of the gear shift lever 4 into the neutral path, that is to say, the selective path 7, requires a retraction of the shifting rod 10b by means of the shifting finger 13b, which is already in engagement. Further sliding motion of the gear shift lever 4 in the direction of the shifting position of the reverse gear R requires a pivoting of the shifting finger 13b up and out of the shifting groove 27b of the shifting rod 10b. As this is completed, then the shifting rod 10b can be moved no farther than into the neutral position. The shifting finger 13a is, by the movement of the gear shift lever 4 in the direction of the shifting position of the reverse gear, is once again pivoted into shifting groove 27a of the shifting rod 10a. When this happens, the shifting finger 13a moves with its side surfaces in contact with a side surface of the shifting groove 27a and pushes, upon further turning of the gear shift lever 4 shifting rod 10a to the actuation position of the reverse gear. The shifting rod 10a, at this point is pushed in the same direction as the movement direction of the gear shift lever 4 upon shifting to the reverse gear.

Figure 4:
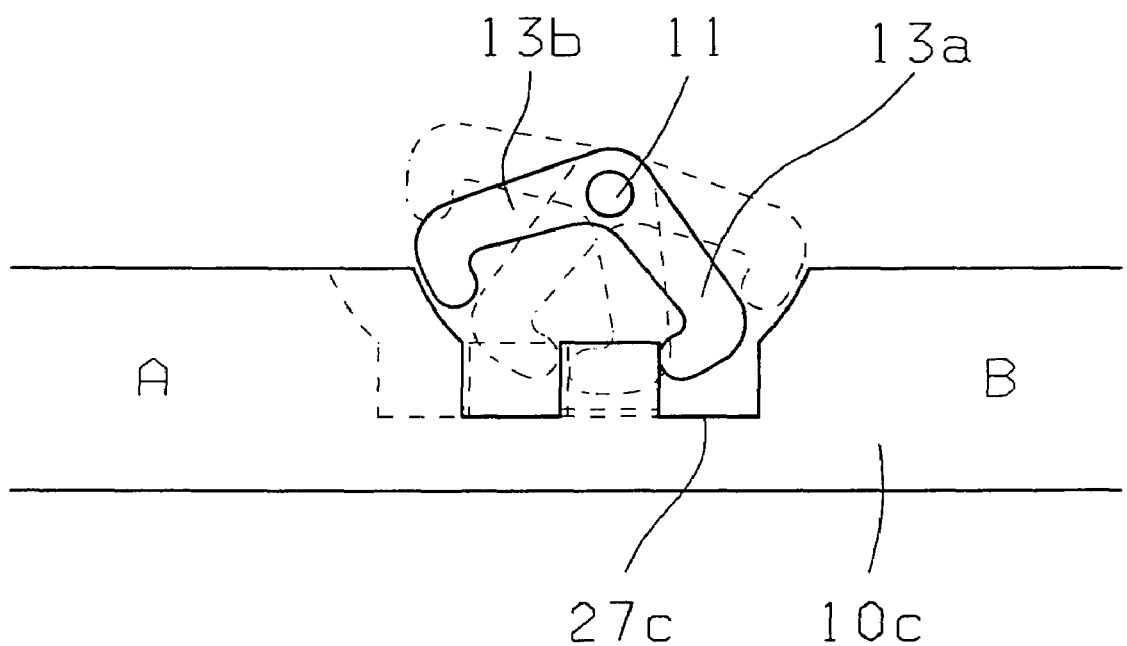
FIG. 4 is in specific detail, of selection fingers engaged with a shift rod.

FIG. 4 shows an alternative design of a shifting finger 13. In this case, the shifting finger 13 is constructed in a symmetrical pattern, and has two arms 13a, 13b. It is mounted on the shifting finger shaft 11 and engages in the shifting groove 27c of the shifting rod 10c. Upon the rotation of the shifting finger 11 in the clockwise direction, the arm 13a of the shifting finger 13 inserts itself in the gear A of the shifting rod 10c. At the same time, the arm 13b pivots out of the symmetrically recessed shifting groove 27c. For leaving the gear A, then the shifting finger shaft 11 must rotate counterclockwise, whereupon, the shifting finger arm 13a pushes the shifting rod 10c back. If, to engage another gear stage, the shifting finger shaft 11 turns further in a counterclockwise direction, then the shifting finger arm 13a lifts out of the shifting groove 27c. If the leaving of one gear A, and the insertion of another (not shown) new gear occurs quickly, then, because of the inertia of the shifting rod 10, it can happen, that this shifting rod 10 again retracts in the direction of an entry of the gear B. In order to prevent this, the shifting finger arm 13b, upon the establishment of another new gear, which must lie opposite to the shifting position of the gear stage A in the shifting pattern, pivots into shifting groove 27c, and does so, however, without displacing the shifting rod 10c. Thereby, an inadvertent setting of the gear B is prevented, since the shifting rod 10c, upon the described contacting of the shifting finger arm 13d becomes immobile.

Figure 5A:
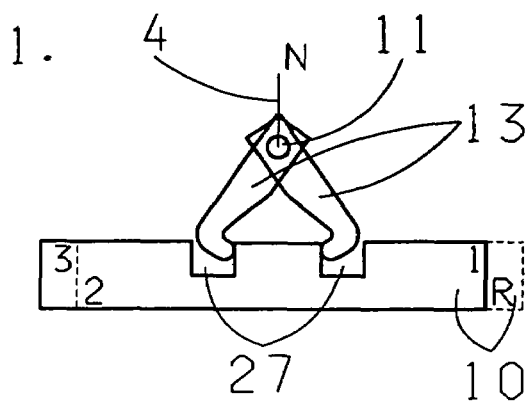
FIG. 5a is a principal representation of the manner of functioning of the conversion apparatus.
Figure 5A:
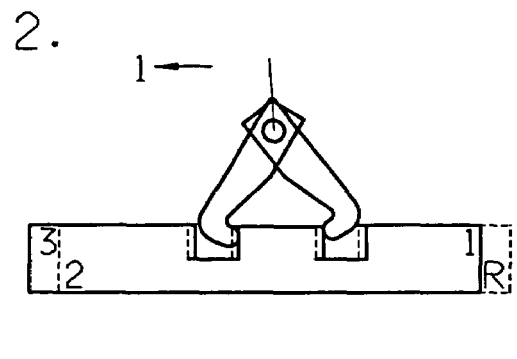
Figure 5A:
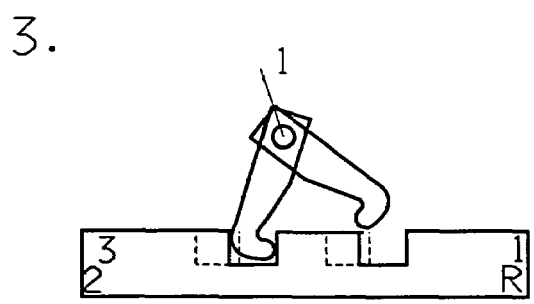
Figure 5A:
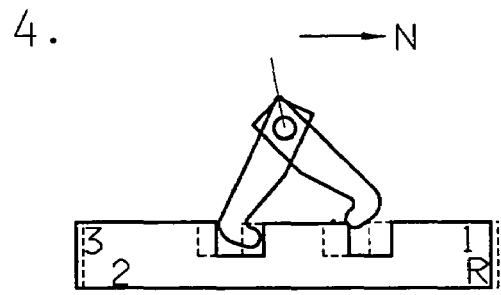
Figure 5A:
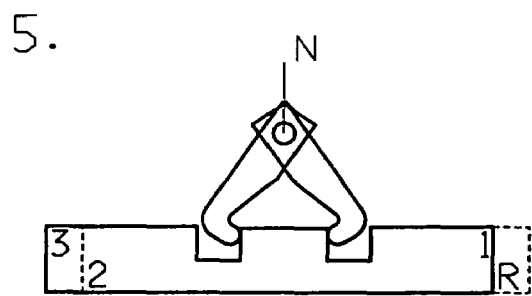
Figure 5A:
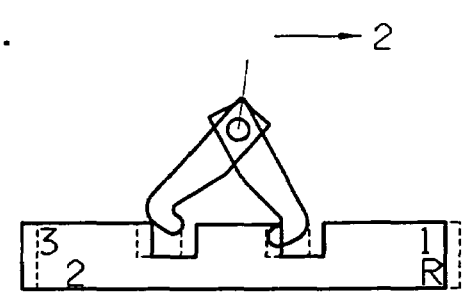
Figure 5A:
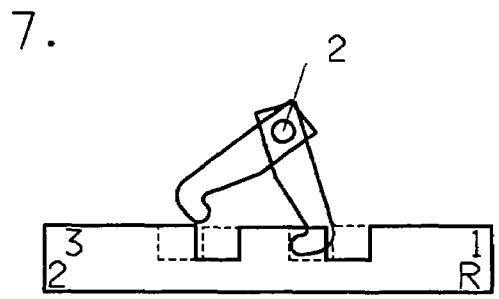
Figure 5B:
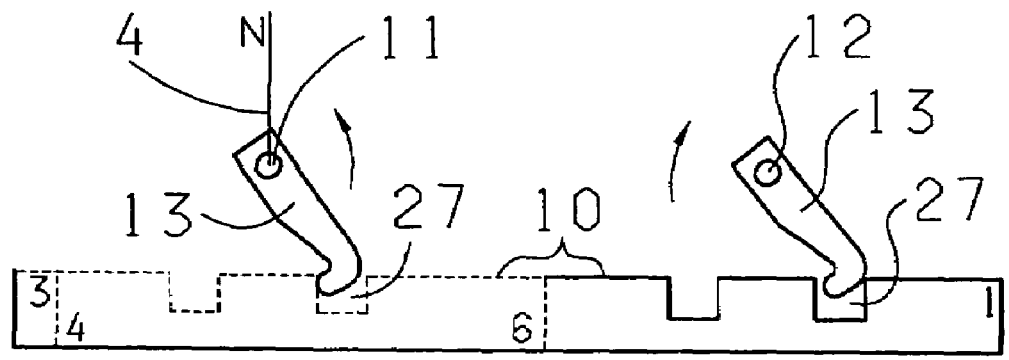
FIG. 5b is a second presentation of the principal representation of the manner of functioning of the conversion apparatus'.
Figure 5B:
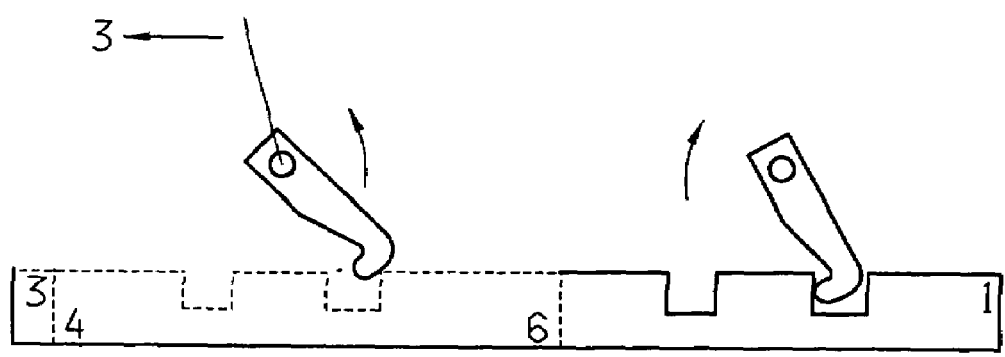
Figure 5B:
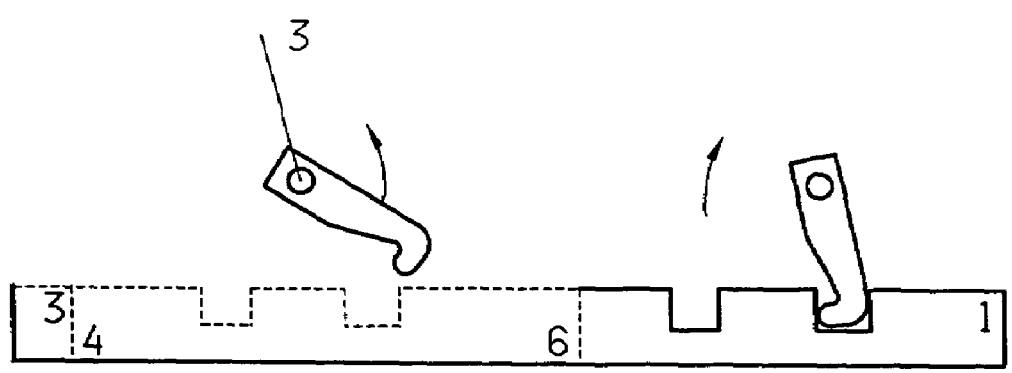

FIGS. 5a and 5b show a principal presentation of the method of functioning of the conversion apparatus 8. In FIG. 5a, the gear shift lever 4 is found in the path of the first and second gears. In this case, the two shifting fingers 13 are pivotally carried on the same shifting finger shaft 11. The left shifting finger of the two shifting fingers 13 engages into the shifting rod of the first and third gears, which as here shown in solid lines. The right of the two shifting fingers engages in the dotted line shifting rod of the second gear and the reverse gear. The two shifting rods and the associated shifting finger 13, as is clear from illustration 3, are brought into different planes, which planes, as to be understood in FIGS. 5a and 5b, are projecting in the plane of observation. In the first drawing of the FIG. 5a, the gear shift lever 4 finds itself in a neutral position. The shifting finger shaft 11 is so placed, that it does not stand perpendicularly above the shifting groove 27. In the second drawing of the FIG. 5a, for the setting of the first gear, the gear shift lever 4 is moved to the left. In this way, the left shifting finger slides the shifting rod of the first and third gears to the right. In the third drawing of FIG. 5a, the first gear is established, the shifting rod of the first and third gears is—corresponding to a shifted position—pushed to the right and the right shifting finger has completely lifted itself out of the shifting groove of the shifting rod of the second gear, while it avoids having pushed this shifting rod during the attainment of the first gear. In the fourth drawing of FIG. 5a, the first gear is again not in use, for which the gear shift lever 4 is moved to the right and back into the vertical position. In this situation the right shifting finger enters again into the shifting groove of the shifting rod of the second gear and the reverse gear, while the left shifting finger pushes back the shifting rod of the first gear. The fifth drawing represents the first drawing, in which both gears are released. In the sixth drawing, for the engagement of the second gear, the gear shift lever is moved to the right, When this is done, the left shifting finger raises itself out of its shifting groove of the shifting rod of the first and third gear. The right shifting finger pushes to the left the dotted lined shifting rod of the second gear and the reverse gear. In the seventh drawing, the second gear is in action, the left shifting finger has raised itself completely out of the shifting groove of the first and third gear, and the right shifting finger has placed itself essentially vertically under the shifting shaft 11 and thereby the shifting rod of the second gear and the reverse gear is pushed to the left.

As one can readily see from the FIG. 5a, it is clear that the arrangement of the shifting finger on the shifting finger shaft, onto which the gear shift lever 4 is directly connected, requires a counter direction, sliding displacement direction of the shifting rods in relation to the activation direction of the gear shift lever 4.

In FIG. 5b, the manner of functioning of the conversion apparatus 8 is presented, in the case of a positioning of the gear shift lever 4 in a shifting path, in which the already engaged shifting finger 13 has been imposed upon various shifting finger shafts 11, 12. A coupling of the two shifting finger shafts 11, 12 is not shown, but is obvious from FIG. 3. The left shifting finger 13, to which the shifting finger shaft 11 is assigned, is in engagement with the shifting rod of the fourth and sixth gear, which here is shown in dotted lines. The right shifting finger 13, to which the counter rotating shifting finger shaft 12 belongs, is assigned to the shifting finger shaft of the first and third gear. Also, in this case, the two shifting rods find themselves with the associated, engaged shifting finger shafts in various planes, which, however, in the drawing are projected into one plane. In the top drawing, the gear shift lever 4 finds itself in a neutral position, and the two gears, the third and the fourth gear are not engaged. For the engagement of the third gear, the gear shift lever, in accord with its shifting pattern, is moved in the direction of the shift-position of the third gear. The gear shift lever 4, in accordance with the middle drawing, is pressed to the left. In this case, the shifting finger 13, to which the shifting finger shaft 1 of the gear shift lever 4 is assigned, lifts itself completely out of its shifting groove 27 of the fourth and sixth gear. The shifting finger 13, which is installed upon the shifting finger shaft 12, rotates in a clockwise direction, because of the counterclockwise direction of the rotation of the shifting finger shaft 12. As this proceeds, the shifting finger 13 pushes the penetrating, shown shifting rod of the first and the third gear to the left. In the lowest of the drawings, of FIG. 5b, the engaged position of the third gear is shown. The left shifting finger of the fourth and sixth gear is completely pivoted out of the shifting groove of the shifting rod of the fourth and sixth gear. The shifting finger of the third gear, which is seated on the shifting finger shaft 12, turned so as to be essentially vertically under the shifting finger shaft 12. From the FIGS. 5a and 5b, it is obvious, that an essential design feature of the invented conversion apparatus of the decentralized arrangement of the two shifting finger shafts 11 and 12 is above the shifting grooves 27 of the individual shifting rods. Thereby, assurance is provided, that an escape pivoting of a shifting finger 13 out of its shifting groove 27 can be done without a sliding displacement of the attendant shifting rod. For the engagement of a gear, in accord with the invention, provision has been made, that the respective shifting finger 13, regardless of whether or not it is assigned to shifting finger shaft 11, 12, is so placed on the shifting finger shaft, that it, upon activation of the gear shift lever 4, is turned vertically to the shifting rod, under its shifting finger shaft.

Figure 6A:
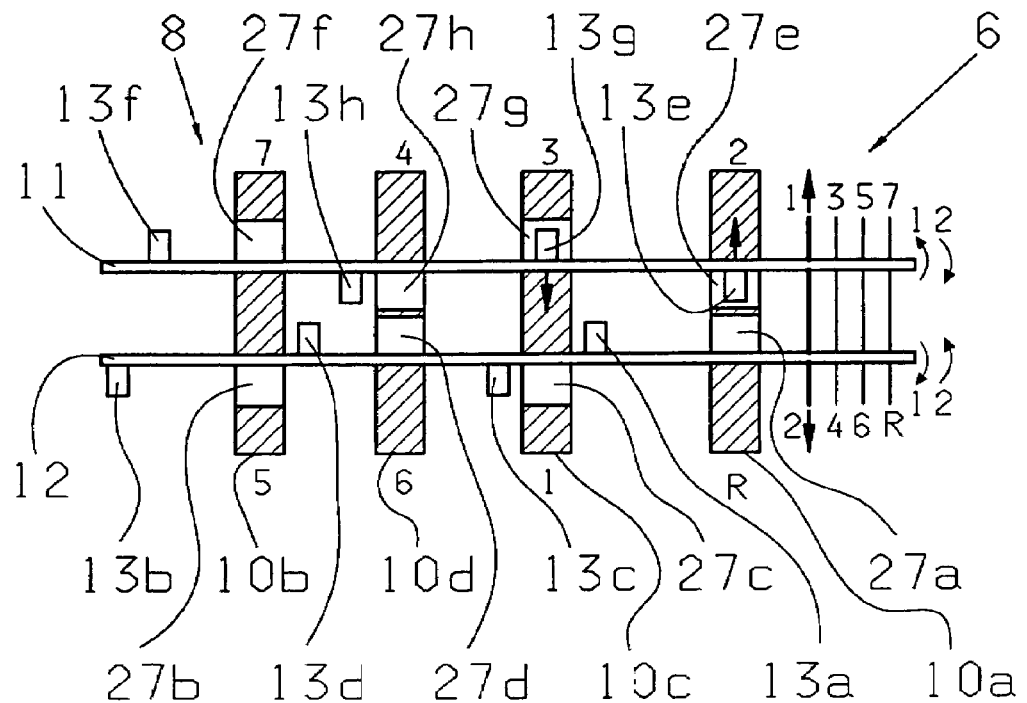
FIGS. 6a to 6d are a conversion apparatus of FIG. 3, in schematic presentations for various shifting positions.
Figure 6B:
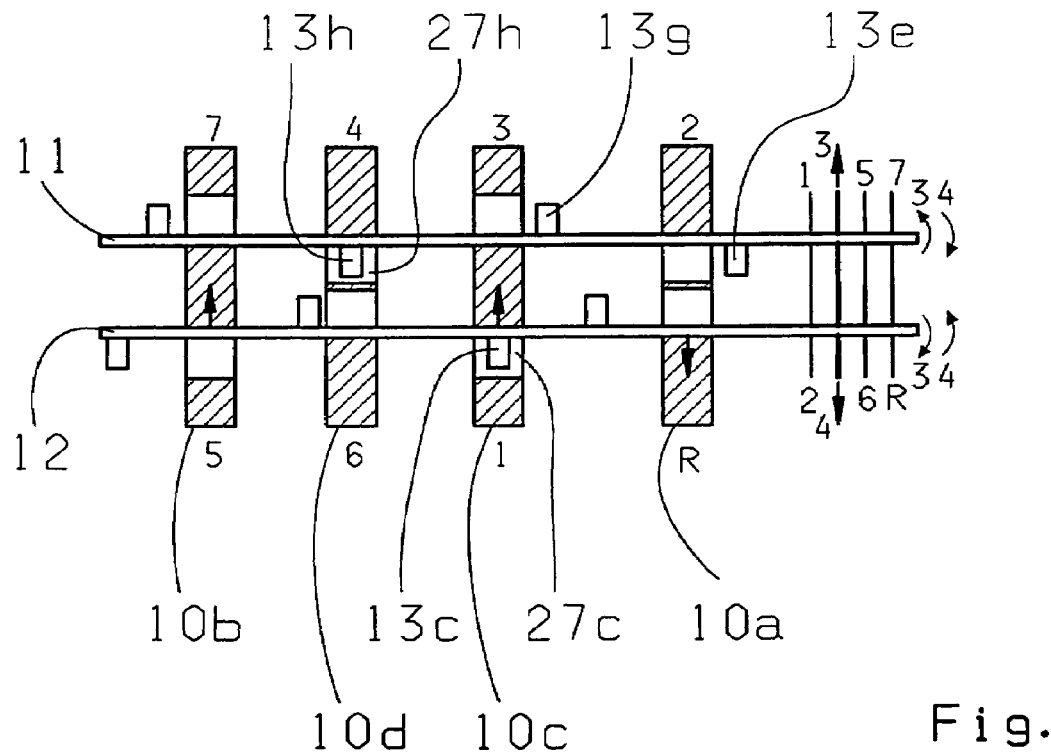
Figure 6C:
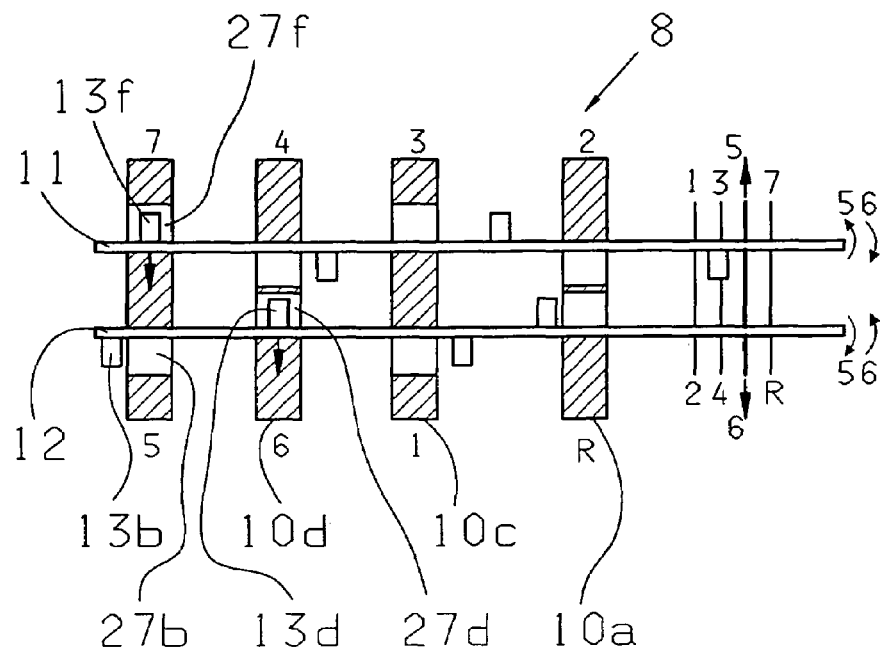
Figure 6D:
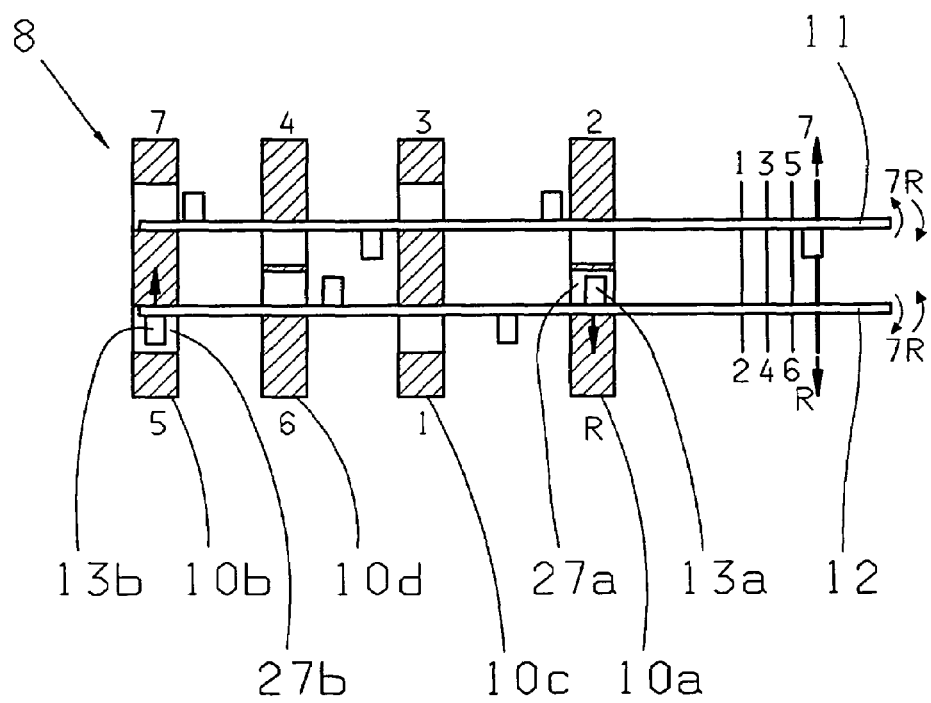

In the FIGS. 6a to 6d the conversion apparatus 8 is shown in various shifting position for the shift path 1',2' (FIG. 6a), for the shift path 3',4' (FIG. 6b), for the shift path 5',6' (FIG. 6c) and for the shift path 7', R (FIG. 6d). The presentation represents schematically, essentially the design in accord with FIG. 3, whereby, for the sake of simplicity, in FIG. 3, the shifting pattern 6 is projected out of a provided plane above the shifting finger shafts 11, 12, into the plane of the shifting finger shafts 11, 12. The shifting rods 10a, 10b, 10c and 10d are axially parallel to one another and axially slidably in bearings in a (not shown) transmission housing, whereby, in the neutral position, the ends of the rods 10a to 10d lie in one plane. The numerals given on the shifting rods 10a to 10d, namely 1 to 7 and R, mark the gear stages. For the engagement of a gear, that is to say, for the activation of a shifting packet, a shifting rod is respectively pushed axially, so that, in accord with the shifting procedure, the end of the shifting rod provided with the numeral, extends itself beyond the ends of the remaining non-engaged shifting rods.

As has already been partially explained above, the conversion apparatus 8 (FIG. 6a), consists of, essentially, the shifting rods 10a to 10d, which are provided with shifting grooves 27a to 27h for the reception of the shifting fingers 13a to 13h. Respectively, four shifting fingers 13a, 13b, 13c, 13d are affixed, rotationally secure, with the shifting finger shaft 12 and four shift fingers 13e, 13f, 13g, 13h are likewise, rotationally securely bound to the shifting finger shaft 11. The shifting finger shafts 11 and 12 are essentially axially parallel to one another, but placed in a transverse alignment to the shifting rods 10a to 10d in a plane "above" the shifting rods 10a to 10d. The shifting finger shafts 11 and 12 are supported, by means of the gear shift lever 4 shown in FIG. 3, and are both axially displaceable as well as rotatable around their own axes. By means of the coupling of the two shifting finger shafts 11, 12 by the intermeshed gears 24 and 25, (see FIG. 3) either both shafts were rotatable in the same sense, or were rotatable in the opposite sense. The stated numerals, 1, 2, beside the arrows pointing in the rotary directions, provide the respective gear stages 1 or 2, which represent the direction of rotation of the shifting finger shafts 11, 12.

By means of the complementary meshing order of the shifting finger 13a to 13h on the shifting finger shafts 11, 12, in accord with a desired gear stage, or, in other words, in accord with a selected shifting path, in particular shifting path 1'-2' (see FIG. 6a), two shifting finger 13e and 13g of the shifting finger shaft 11 are brought to coact with corresponding shifting grooves 27e and 27g of the shifting rods 10a, 10c. Upon the pivoting of the gear shift lever in the shift path 1'-2', in the forward direction, (see again the shifting pattern 6 in FIG. 3), thus in the direction of the first gear, the shifting finger 13g pivots "under" the shifting finger shaft 11 and brings is side surface in contact with the face of the end of the shifting groove 27g, and pushes, with further pivoting, the shifting rod 10c in the direction of the arrow (in the plane of the drawing, this is "down"), so that after the conclusion of the shifting operation the shifting rod 10c, with its "under" end, again in the plane of the drawing, extends beyond the remaining ends of the shifting rods 10a, 10b and 10d. This end position is, for the sake of clarity, not shown. At the same time, during the engagement of the first gear, the shifting finger 13e of the second gear pivots itself out of the shifting groove 27e. The shifting grooves 27a to 27h are so designed, that they respectively possess a "sharp-edged" end surface in an axial direction for contacting a shifting finger and on their opposite end face possess an essentially inclined, bow formed, recess, which enables the pivoting of the corresponding shifting fingers out of the groove, while this action does not produce a movement in the shifting rod.

For the shifting of the second gear (FIG. 6a), the gear shift lever is pivoted in the shift pattern 6' in the direction 2. As this occurs, on the one hand, the back-pivoting shift-FIG. 13g draws the shifting rod 10c back again into its neutral position, while on the other hand, now the shifting finger 13e engages itself in the shifting groove 27e and comes to rest on the 'sharp-edged' end face of the groove 27e and subsequently takes along the shifting rod 10a in the arrow direction of the second gear (upward, in the plane of the illustration). When the second gear is engaged, then the "upper" end of the shifting rod 10a (designated by the number 2) extends beyond the other shifting rods 10b, 10c, 10d. This position is, for the sake of clarity, not shown. Upon the reverse pivoting of the gear shift lever out of the shifting position 2' to the neutral position, then the previously described movements occur in the reversed sequence. The remaining shifting finger, besides the two on the shifting 1'-2' participating shifting fingers 13e, 13g do not engage during the shifting 1'-2'. This is also valid in an analogous manner for the other successive, still to be described shiftings. In the shifting paths 1'-2' are also to be found the shifting fingers 11, 12 in their left contacting position in the plane of the drawing. Furthermore, during the shifting 1'-2', only two shifting finger 13e, 13g, are involved, which are fastened on a common shifting finger shaft 11. A "counter-sense" motion of the second shifting finger shaft 12 is, on this account, not necessary in the shifting 1-2.

By means of a change of the shifting path from 1'-2' to 3'-4' (FIG. 6b), first, the shifting finger shafts 11, 12 are moved equally in the plane of the drawing, to the right, so that the shifting fingers 13e, 13g of the first and second gears are pivoted out of the shifting grooves 27e, 27g and the shifting rods 10a, 10c are released. As soon as the shifting path 3-4 is made use of, then the shifting fingers 13c, 13h in the shifting grooves 27c, 27h engage, whereby the shifting finger 13c locates itself on the shifting finger shaft 12 and the shifting finger 13h locates on the shifting finger shaft 11. Upon pivoting the gear shift lever in the position for the third gear, then the shifting finger shaft 12 rotates in a direction counter to that of the shifting finger shaft 11, but rotates in a direction which is the same as that of the motion direction of the gear shift lever. In this way, the shifting finger 13c produces an axial sliding displacement of the shifting rod 10c in the direction of the third gear, that is to say, "upward" in the plane of the drawing. Upon an engaged third gear, the end of the shifting rod marked with a "3" of the shifting rod 10c, extends beyond the ends of the remaining shifting rods. In the case of a change from the third into the fourth gear, first, the shifting finger 13c retracts the shifting rod 10c back again, until it reaches the neutral position and then pivots out of the shift groove 27c, so that subsequently the shifting finger 13h on the other shifting finger shaft 11 pivots into the shifting groove 27h and thereafter, the shift rod 10d slidingly moves in the direction of the fourth gear. At the same time, differing from the shifting 1-2, the two stressed shifting fingers 13c, 13h execute a pivoting motion in the same direction and take with them the shifting rods 10c, 10d in the same direction.

Analogous to the two already described shiftings 1-2 and 3-4, the shiftings 5'-6' (FIG. 6c), as well as 7-R (FIG. 6d) are also carried out, whereby the shifting finger shafts 11, 12 are respectively, pushed axially to the corresponding shifting path positions and in this way, different shifting rods are activated. That is to say, non-shown shift packets with the shifting rods are activated. In the case of the shiftings 5'-6', two shifting fingers 13f, 13d engage which have been placed on different shifting finger shafts 11, 12. This allows that the corresponding shifting rods 10b, 10d are pushed in the same direction.

In the case of the shiftings 7'-R (FIG. 6d), both of the two shifting fingers 13b, 13a are activated, which said fingers are on a common shifting finger shaft 12 and the corresponding shifting rods 10b, 10a are pushed in different directions.

Obviously, besides the previously described conversion apparatus with axial slidable shifting rods, also a design has been proposed, which provides one or more fixed "shifting rod(s)", upon which axially displaceable, sliding collars, with affixed shifting forks are placed. Alternative to the design of shifting fingers, which has been described in detail, and shifting rods with shifting grooves, a design is also possible wherein on a shifting shaft, pivotally mounted toothed segments are provided, which coact with the teeth of a corresponding rack, instead of a shifting rod for the same function.

Figure 7:
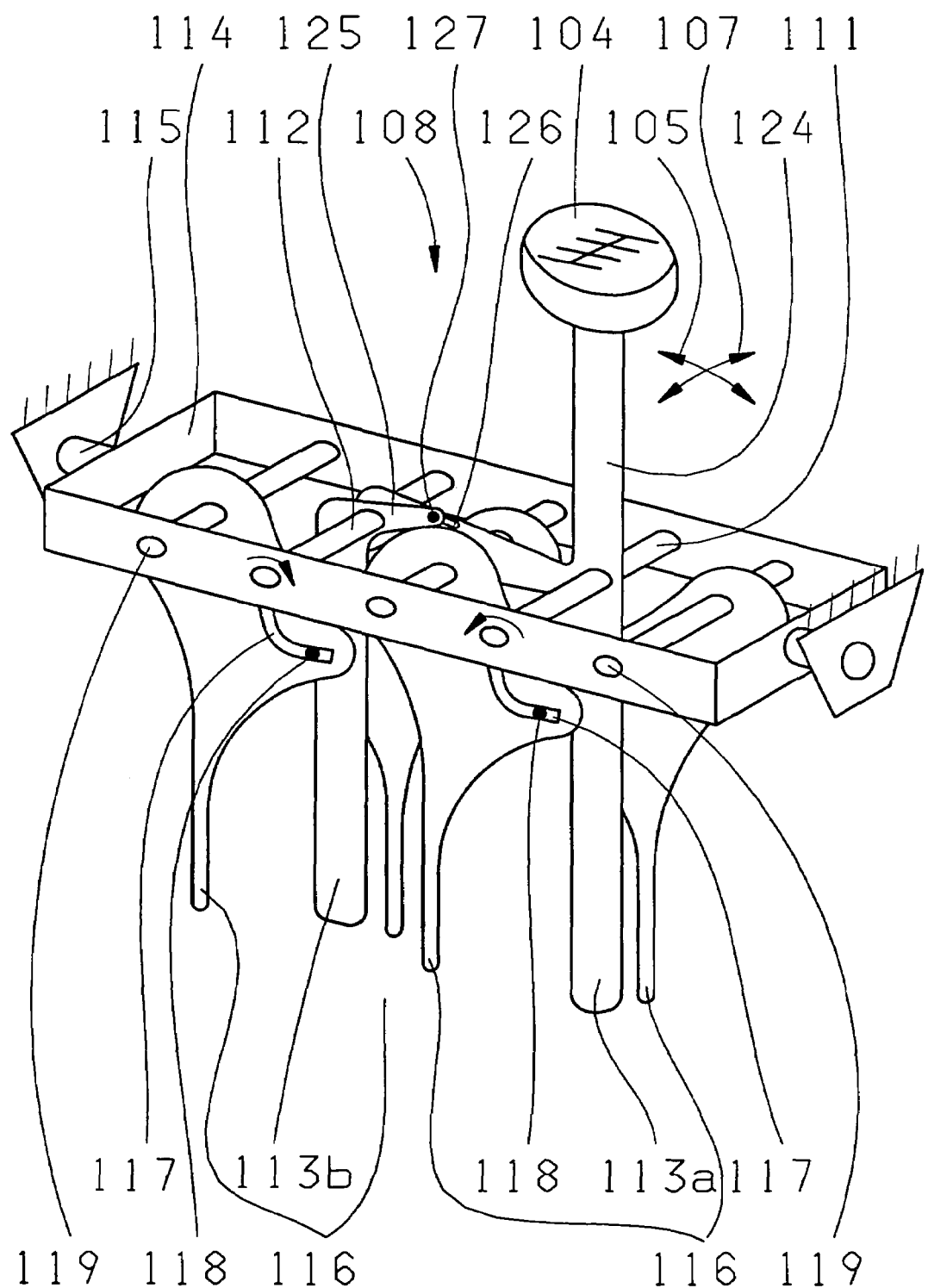
FIG. 7 is an additional embodiment of a manually operated shifting-means together with the corresponding shifting-fingers.

In FIG. 7, is shown an alternatively designed embodiment of the invented conversion apparatus. The conversion apparatus 108 consists, essentially, of a rectangular frame 114, which carries the shifting finger shafts 111, 112, as well as additional shafts 119. The frame 114, relative to its longitudinal axis, is mounted with rotational capabilities. To this end, on the two end faces of the frame 114 rotational bearings 115 are placed. The gear shift lever 104 is rigidly bound with the shifting finger shafts 111. The shifting finger shafts 111, 112, as well as the remaining shafts 119 are aligned in parallel and are placed transverse to the rotational axis of the frame 114. The gear shift lever 104 forms, in its extended shape, the shift finger 113a. The thereto belonging shift finger shaft 111 is pivotally mounted within the frame 114. The shifting finger shaft 112, which is likewise mounted in the frame 114, carries a second shifting finger 113b. The two shifting fingers 113a, 113b are coupled together by the levers 124, 125. Hereto related, in the lever 124 is incised a longitudinal groove 126, and on the lever 125 of the shifting finger 113b is installed a bolt 127. This engages itself perpendicularly into the groove 126 of the lever 124. Thereby, the shifting fingers 113a, 113b along with the two shifting finger shafts 111, 112, in accord with the invention, are coupled together, so that a motion of the gear shift lever 104 along a shifting path direction 105 acts to cause a countered motion of the two shifting fingers 113a, 113b. On the shafts 119, which, likewise are mounted in the frame 114, is found the shift-extenders 116. These shifting extenders 116 are coupled with the shifting fingers 113a, 113b to each of which, two shifting extenders 116 are assigned. The shifting extenders 116 are provided with guide grooves 117, into which guide elements 118 engage, which said elements are rigidly placed on the two shifting fingers 113a, 113b. If the gear shift lever 104 should move along the selective path direction 107 of its shifting pattern, then, therewith the complete conversion apparatus 108 pivots about its axis, which is formed by the two turning bearings 115.

Figure 8:
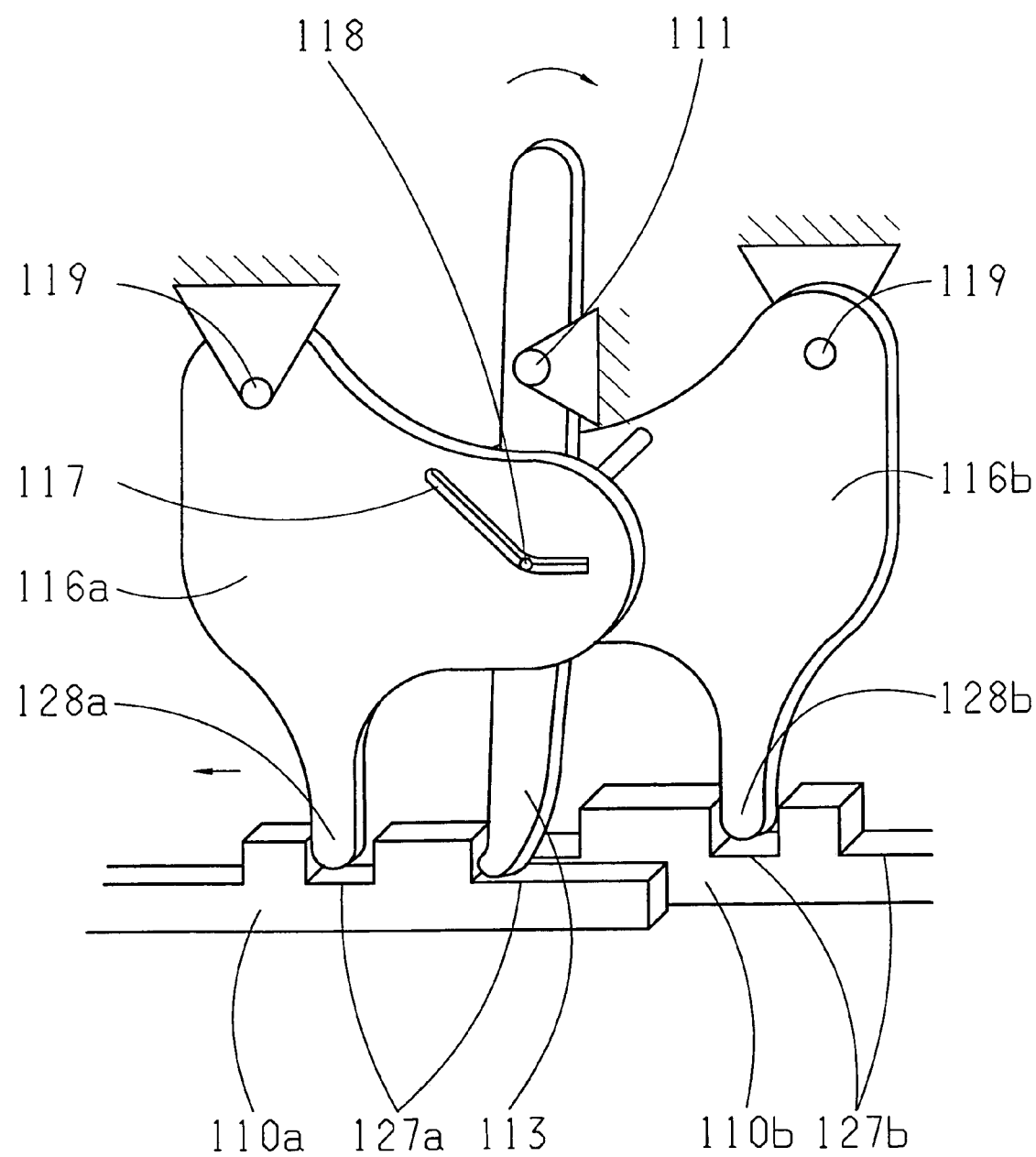
FIG. 8 individually, one shifting finger, two different shifting rods as well shifting layout elements.

FIG. 8 shows in a single presentation, a shifting finger 113, to which two shifting extensions 116, as well as two shifting rods 110a and 110b are respectively attached. The shifting finger 113 and the two thereto belonging shifting extension elements 116a, 116b lie with the forward shifting rod 110a in one plane. In this case, one shifting extension finger 128a of the shifting extension, as well as the shifting finger 113 engage in the shifting grooves 127a of the shifting rod 110a. If, by means of a (not shown) gear shift lever, the shifting finger 113 turns in a clockwise direction, then the shifting finger 113 slidingly pushes the shifting rod 110a to the left. When this happens, then the shifting extension 116a turns itself about its axis, which runs through the shaft 119. The motion of the shifting extension 116a is accomplished, essentially by means of the sliding of the shifting rod 110a, since the shifting extension finger 128a is guided in a thereto assigned shifting groove 127a of the shifting rod 110a. The guide element 118, which is rigidly bound to the shifting finger 113, runs, in this case, in the guide groove 117 of the shifting extension 116a in the sectional area of the guide groove 117 which is formed by the shifting rod 110a and runs angularly to the shifting rod 110a. The right hand shifting extension 116b, which is not in connection with the shift rod 110a, is made identical to the left hand shifting extension 116a. In the (not shown) guide groove of the right shifting extension, a guide element engages, which is to be found on the shifting finger 113. Upon the pivoting of the shifting finger 113 in the clockwise direction, then the guide element runs in that partial length of the guide groove of the shifting extension 116b, which is essentially parallel to the shifting rod 110a. Upon the turning of the shifting finger 113 in the clockwise direction, out of a neutral setting, then the shifting extension element 116b is not turned, using the guide groove exactly represents the track of the guide element. If, for the purpose of a release of an existing gear stage, which said gear stage was attained by the shifting rod 110a, the shifting finger 113 is turned counterclockwise to the left, then the guide element 118 runs back in the guide groove 117 of the shifting extension 116a. In accomplishing this, the guide element 118 executes a turning of the shifting extension 116a in a counterclockwise direction. Thus, by the shifting extension fingers 128a, the shifting rod 110a is moved to the right, which causes a release of the actually engaged gear stage. Upon reaching the neutral position, which corresponds to a selective direction of the gear shift lever, at that point the guide element 118 has moved into the bend of the guide groove 117. From this point on, it runs in the right hand part of the guide groove 117, which coincides with the track of the guide element 118, whereby, a further pivoting of the shifting finger 113, in a counterclockwise direction, requires no necessarily coupled turning of the shifting extension 116a. Thereby the shifting fingers 113 can be released, by counter turning, from the here mentioned neutral position, without that the shifting extension 116a must push the shifting rod 110a to the right, and thereby establish a set gear stage. In order to shift a gear stage by the shifting finger 113, which is assigned to the shifting rod 110b, it is necessary that that the gear shift lever must be pivoted along the selective path 107, whereby the shifting finger 113 as well as the two shifting extensions 116a, 116b are pivotally displaced parallel to the two shifting rods 110a, 110b. Thereby the shifting extension 128b and the shifting finger 113 engage in the shifting grooves 127b of the shift rod 110b.

Figure 9:
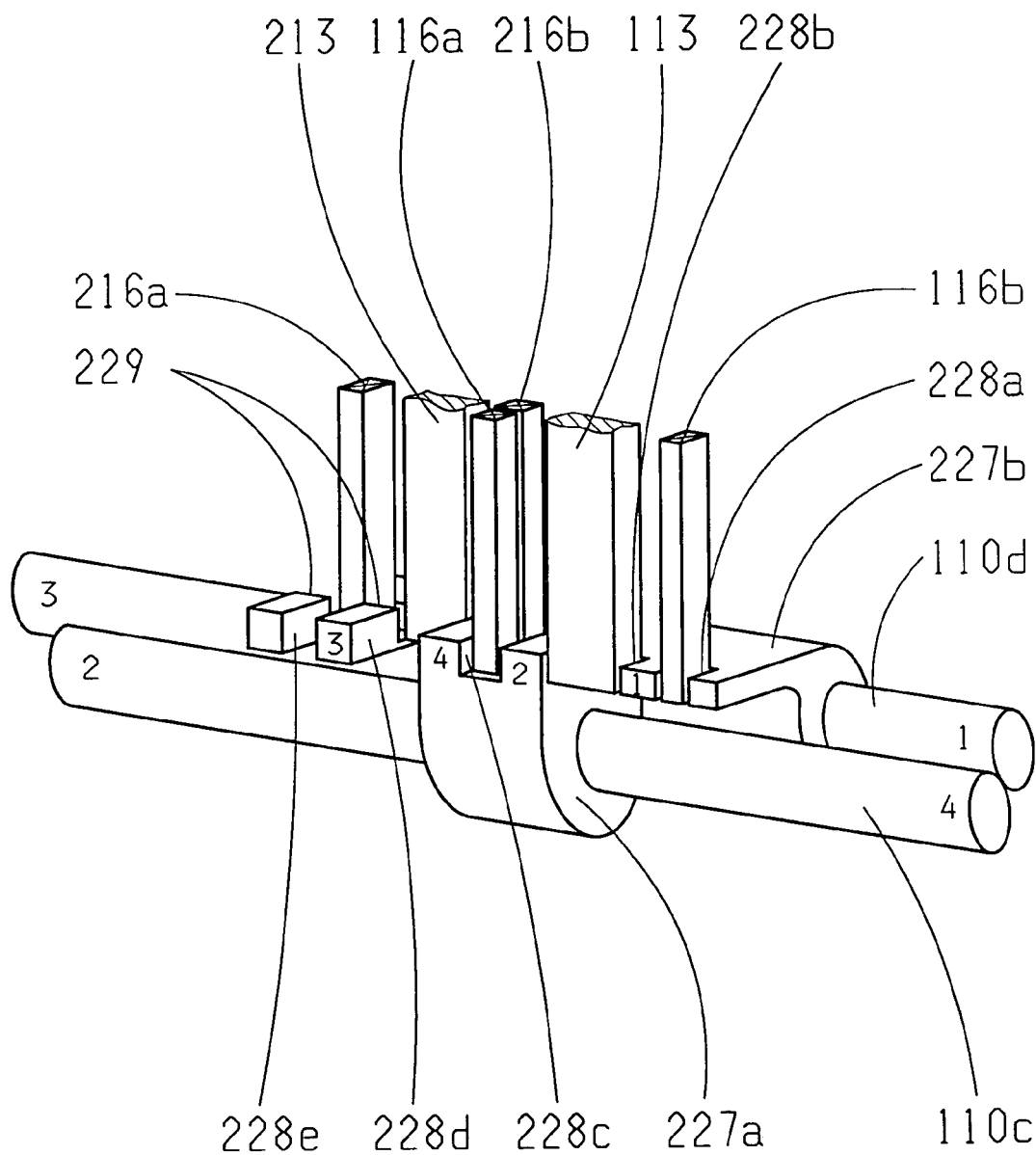
FIG. 9 is a presentation in accord with FIG. 6, with corresponding shifting rods and shifting fingers.

In FIG. 9, we are shown, in a symbolic manner, the shifting fingers 113, 213, as well as the thereto belonging shifting extensions 116a, 116b, 216a, 216b in co-active association with two shifting rods 110c, 110d. The shifting fingers with their associated shifting extensions are placed in two parallel planes. In this case, the shifting finger 213 as well as the shifting extensions 116a, 116b are placed in one plane, and the shifting finger 213 with its shift extensions 216a, 216b are to be found in the second parallel plane. On the two shifting rods 110c, 110d are shifting groove elements 227a, 227b rigidly mounted. The shifting groove element 227a is placed on the shifting rod 110c, whereby it carries shifting groove 228c, which, in itself, is to be found essentially vertically arranged above the shift rod 110c in the plane of the shifting finger 113. Into this shifting groove 228c engages the shifting extension 116a of the shifting finger 113. The shifting finger 113 finds itself in the here indicated neutral position of the shifting apparatus, with its lower end directly beside the shifting groove element 227a. By means of the shifting rod 110c it is possible that the second, or even the fourth gear can be shifted into. The engagement of the second gear is done by the sliding of the shifting rod 110c to the left. For the establishment of a set fourth gear stage, it is necessary that the shifting rod 110c be pushed to the right. The shifting rod 110d is likewise assigned a shifting groove element 227b. The shifting groove element 227b is advantageously of one piece construction and consists of a shell like first part, which encompasses the shifting rod 110d as well as a platelike partial portion which runs parallel to the plane of the shifting rod and extends itself over the shifting rod 110c. Shifting grooves 228a, 228b, 228d, 228e are assigned to the platelike partial portion. In the shifting position, as shown in FIG. 9, in which the gear shift lever finds itself in the neutral position of the path of the first and second gears, engages the shifting extension 116b in the shifting groove 228a. The shifting grooves of the shifting groove element 227b lie in a line with the shifting groove 228c of the shifting groove element 227a. The shifting finger 113 lies with its left lower flank on the outside of the shifting groove element 227a. With its right flank, it lies on the shifting groove 228b of the shifting groove element 227b. A sliding of the shifting finger 113 to the left, results in a sliding of the shifting rod 110c in the direction of the engagement of the second gear. At this point, the shifting rod 110d remains still. A sliding of the shifting finger 113 to the right, from the here illustrated shifting position, actuates, by means of the shifting rod 110d, the setting of the first gear. By means of the invented inversion apparatus, a first sliding of the shifting finger 113 actuates a second sliding of the of the shifting finger 213 in a direction counter to the first. The sliding displacement of the shifting finger 213, however, remains with out resulting action, because the shifting finger 213 as well as the two shifting extensions 216a, 216b run in a transverse groove 229 of the shifting groove element 227b, which runs essentially parallel to the shifting rods.

Figure 10:
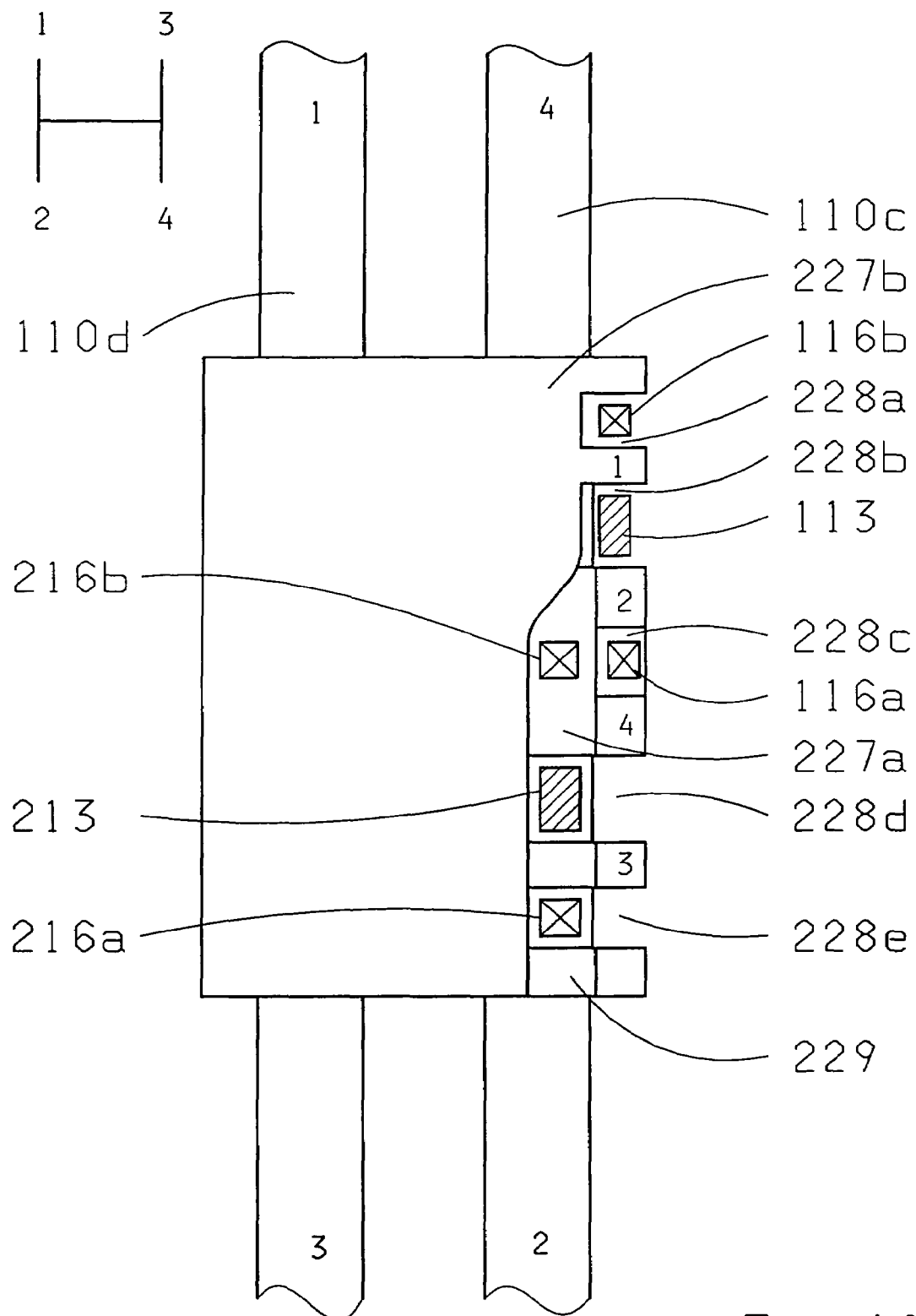
FIGS. 10 and 11 are a top plan views of a presentation according to FIG. 9.

In FIG. 10 is shown a top view of the shifting apparatus of FIG. 9. In this Figure it is clearly to be seen, that the shifting groove element 227b extends itself over both shifting rods 110c, 110d, and the groove 228c of the shifting groove element 227a lies in a line with the grooves 228a, 228b, 228d and 228e. The first and the second gear are both shifted by means of the shifting fingers 113. Thereby, the shifting finger comes in contact with the shifting groove element 227b when the first gear is set and pushes this upward. The shifting extension 116a remains immobilized, during this motion of the shifting finger 113. For the setting of the first gear, the shifting extension 116b pushes the shifting groove element 227b and therewith the shifting rod 110d back. To attain the second gear, the shifting finger 113 pushes the shifting groove element 227a and therewith the shifting rod 110c downward. The shifting extension 116b remains without movement, during the movement of shifting finger 113. For the release of the second gear, the shifting finger 113 is brought back into the shown position. Thereupon, the shifting extension 116a displaces the shifting rod 110c back into the neutral position. If the gear shift lever is placed in the third and fourth gears, then the shifting fingers 113, 213 as well as the shifting extensions 116a, 116b, 216a, 216b are moved in parallel to the right. As this is done, the shifting extension 216b enters into the shifting groove 228c, the shifting finger 213 goes into the shifting groove 228d and the shifting extension 216a enters the shifting groove 228e. A movement of the gear shift lever into the shifting position of the third gear, which lies in the same gear shift lever position as the first gear, produces, by means of the invented inverting apparatus, a movement of the shifting fingers 213 downward. When this occurs, then the shifting finger 213 comes in contact with the shifting groove element 227b and pushes, by means of this, the shifting rod 110d downward in the direction of the shifting position of the third gear. The shifting extension 216b remains, during this movement of the shifting finger 213, without movement. For the release of the third gear, the shifting extension 216a pushes the shifting rod 110d back. The shifting finger 113 and the shifting extensions 116a, 116b move themselves, in this case, freely beside the shifting groove elements 227a, 227b. Upon the attainment of the fourth gear, the shifting finger 213 slides the shifting groove element 227a, and therewith the shifting rod 110c upward. The shifting extension 216a remains, during this movement of the shifting finger 213, without movement. The fourth gear is discontinued by the retraction of the gear shift lever by the shifting extension 216b into the neutral position, that is, into the selective position.

Figure 11:
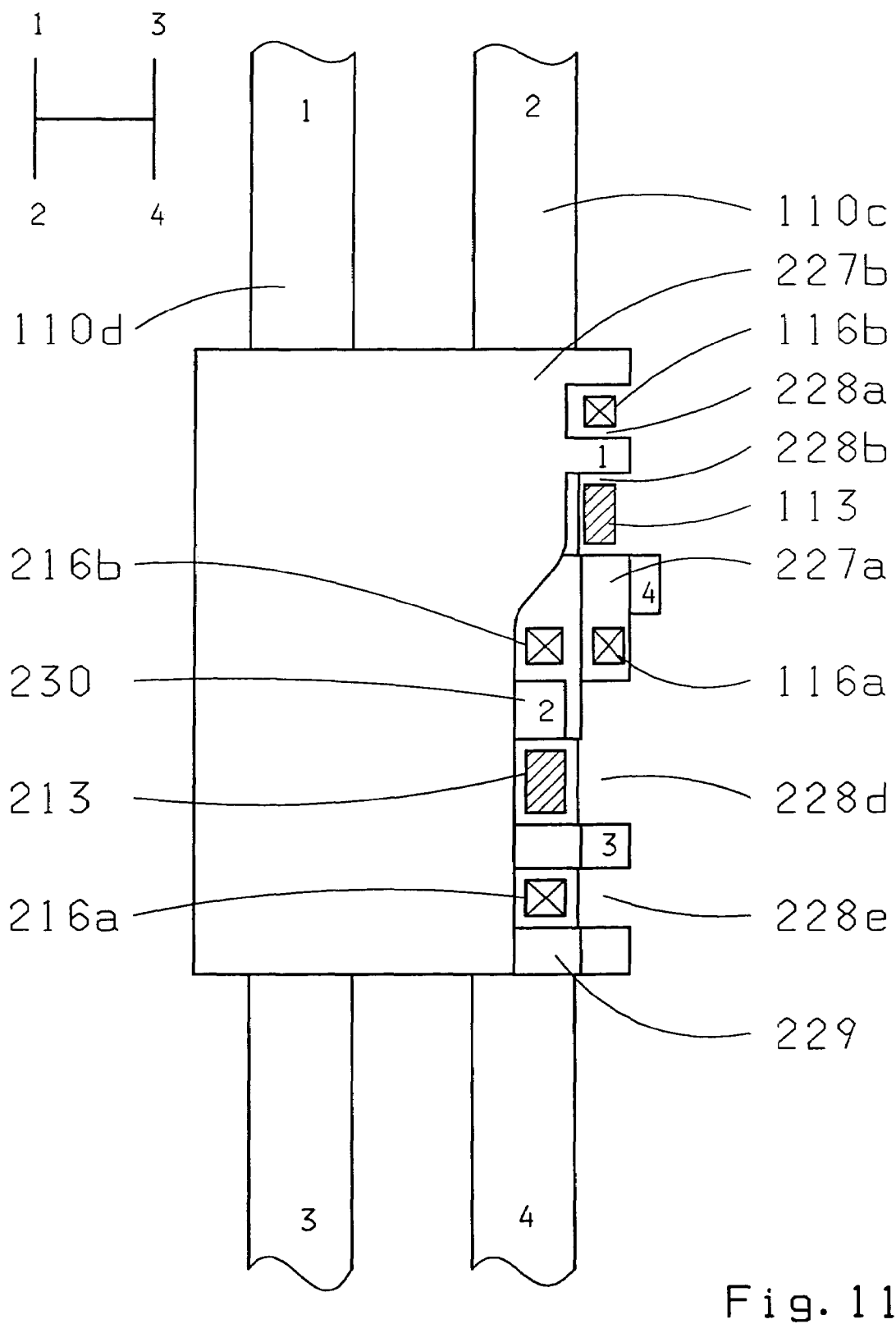

FIG. 11 shows a top view of the shifting apparatus, again of FIG. 10, but wherein the gear stages of the shifting rod 110c are exchanged. The second gear is achieved by the pushing of the shifting rod 110c upward, the fourth gear reached by the sliding the same downward. On this account, a requirement is in order, that, upon shifting in the shifting paths of the first and second gears, both shifting rods, for the attainment of their respective gear stages, namely first or second, must be pushed upward. This is thereby enabled, in that the two shifting path elements 227a, 227b are so designed, that upon reaching the first gear, in accord with FIG. 10, the shifting finger 113 pushes upward the shifting groove element 227b and therewith also the shifting rod 110d. The release of the first gear is done as described under FIG. 10. The shifting finger 213 and the shifting extension 216a move themselves in the transverse groove 229 of the shifting groove element 227b upon the making and breaking of the first gear, but do not move the element. The shifting extension 216b remains, during this operation, fixated in its location in regard to the shifting groove element 227b. Upon the shifting of the second gear, then the shifting finger 213 moves itself because of the cross-coupling of the two shifting fingers 113, 213 by means of the inversion apparatus, for the movement of the shifting finger upward. In this way, the shifting finger 113 comes in contact with the shift lifter 230. which is found on the shifting groove element 227a and extends itself in the direction of the shifting finger. Whereupon it pushes this shifting finger and therewith the shifting rod 110c upward. At the same time, the shifting finger 113 moves itself downward, together with the thereto belonging shifting extension 116a, in a transverse groove running in the direction of the shifting rod of the shifting groove element 227a. The shifting extension 116b remains, during this operation, secure in its location relative to the shifting groove element 227b, so that upon the attainment of the second gear, it is not subjected to any movement. For the release of the second gear, the shifting extension 216b presses against the shifting lift 230 and accordingly pushes therewith the shifting groove element 227a and therewith the shifting rod 110c downward. Upon the selection of the shifting path of the third and fourth gears, the two shifting fingers 113, 213, slide themselves to the left, including all of the shifting extensions 116a, 116b, 216a, 216b, so that the shifting finger 213 with its said extensions 216a, 216b lie in that plane in which previously the shifting finger 113 with its shifting extensions 116a, 116b laid. Upon the attainment of the third gear, the shifting finger 213 slides itself downward, whereby it takes with it the shifting groove element 227b and therewith the shifting rod 110d, since can no longer move freely in the transverse groove 229. The shifting finger 113 and the shifting extension 116b push themselves next to the shifting groove element 227b freely upward, while the shifting extension 116a, relative to the shifting groove element 227a remains secure in its location. Upon the release of the third gear, the shifting extension 216a pushes the shifting groove element 227b upward back into the neutral position. Upon the attainment of the fourth gear, the shifting finger 113 pushes the shifting groove element 227a downward, while the shifting finger 213 and the shifting extension 216b move themselves freely upward. The shifting extension 216a remains fixed in place relative to the shifting groove element 227b. For the release of the fourth gear, the shifting groove element 116a pushes the shifting groove element 227a upward in the direction of the neutral position.

Figure 12:
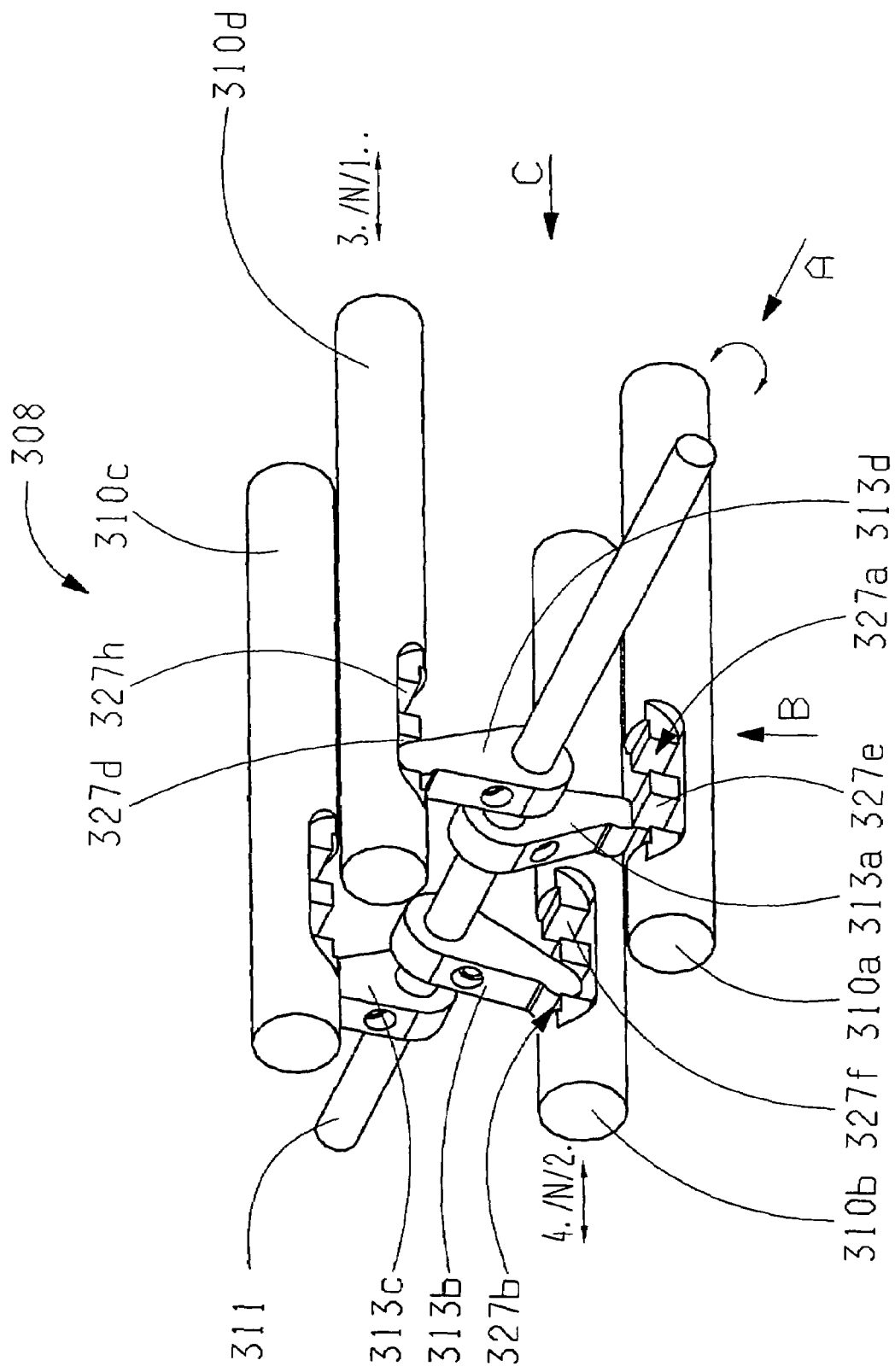
FIG. 12 is an alternative design of the invented conversion apparatus with a shifting finger shaft and the thereto belonging shifting rod, all in perspective.

In a further alternative embodiment of the invention, (FIG. 12), for example, provision is made that the conversion apparatus, that is, the inversion apparatus 308 be constructed out of shifting finger shaft 311 and a plurality of shifting rods 310a to 310d, whereby the shifting finger shaft 311 is placed essentially at right angles to the shifting rods 310a to 310d. In this way, the two shifting rods 310a and 310b (as seen in their installation position when placed in a motor vehicle) are essentially placed underneath and the two other shifting rods 310c and 310d are above or even laterally placed to the left and right of the shifting finger shaft 311. In the shifting rods 310a to 310d are provided, respectively two shifting grooves 327a to 327d and 327e to 327h, respectively, which correspond with the shown shifting fingers. In the case of a turning movement of the shifting finger shaft 311, for instance, in a clockwise direction, the shifting finger 313d pivots into the shifting groove 327d, likewise, turning in clockwise direction, so that the shifting rod 310d is pushed to the right in the direction of the first gear (1). At the same time, the shifting finger 313b pivots upon a turning of the shift finger shaft 311 in the clockwise direction out of the corresponding shifting groove 327b of the shifting rod 310b, so that the shifting rod 310b carries out no pushing motion of its own. The remaining shifting rods 310a and 310c are, not in connection with the corresponding shifting fingers 313a and 313c, so that even these shifting rods 310a and 310c carry out no shifting motions.

If the shifting finger shaft 311, by means of the (not shown) associated gear shift lever is turned in a counterclockwise direction, then, first, the shifting rod 310d by means of the shifting finger 313d is again pushed back into the neutral position (N) and second, the shifting rod 310b, by means of the shifting finger 313b is pushed to the right and the second gear (2.) is attained.

The individual views, namely A, B, C in FIG. 12 are presented again in the following FIGS. 13, 14, 15 in enlarged type.

Figure 13:
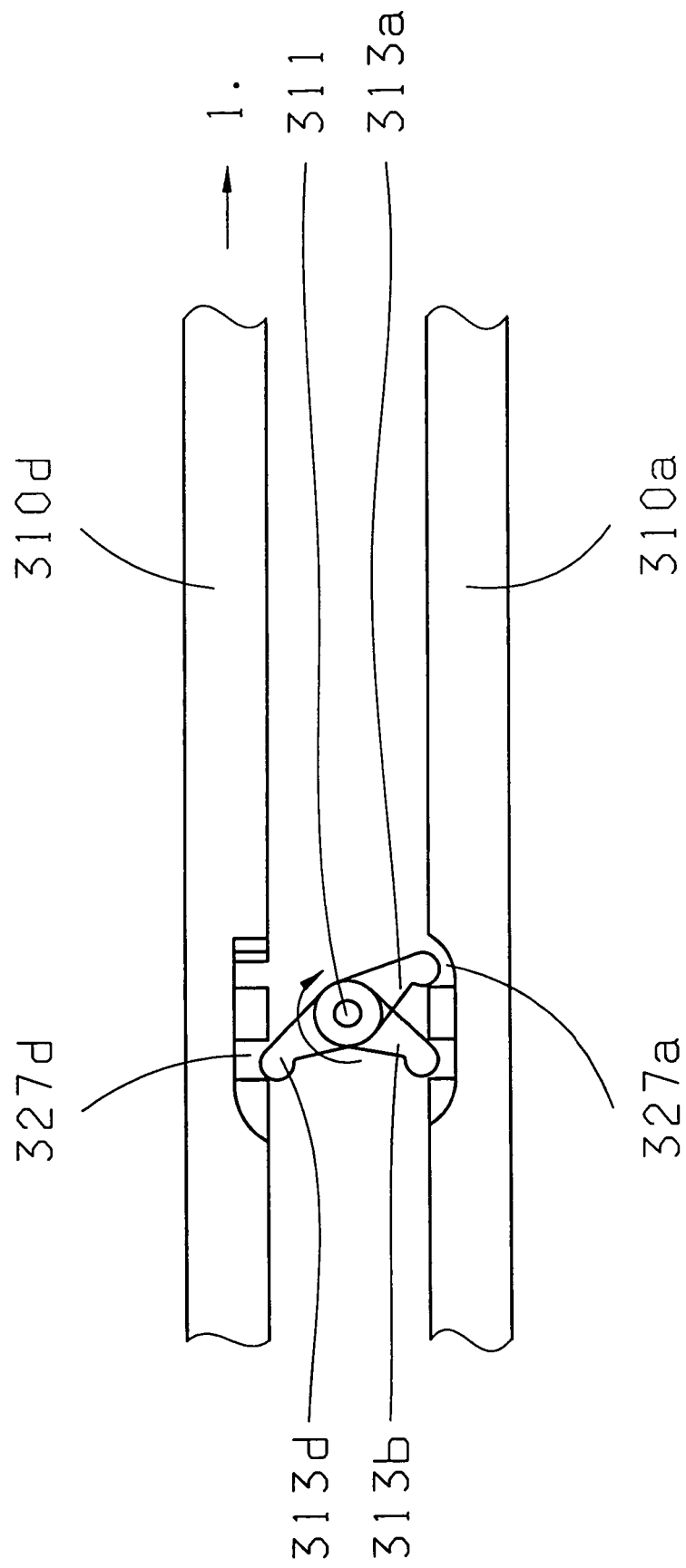

Thus, from FIG. 13, one may infer, that the shifting finger 313d is located in the shifting groove 327d of the shifting rod 310d. In a turning motion of the shifting finger shaft 311 in the clockwise direction, the shifting rod 310d, by means of the shifting finger 313d is pushed to the right and thus, for example, sets the first (1.) gear stage. The shifting finger 313b finds itself in the groove 327b in FIG. 13 of the shifting rod 310b (not shown), which would be found in the drawing plane behind the illustrated shifting rod 310a. The shifting finger 313a is not engaged with the corresponding groove 327a in the shifting rod 310a and pivots, thus, in a plane parallel to the shifting rod 310a, without activating the shifting rod 310a. The position shown in FIG. 13 of the shifting rods 310a and 310d as well as the thereto associated shifting fingers 313 a, b, d corresponds to the neutral position.

If the shifting finger shaft 311 (FIGS. 13, 14) are again turned back in counterclockwise rotation, then the shifting rod 310d is returned to the shown neutral position and the first gear (1.) is set. During a further rotating motion of the shifting finger shaft 331 against the clockwise direction, the shifting finger 313d pivots out of the shifting groove 327 of the shifting rod 310d to the left and the shifting finger 313b enters into the shifting groove 327b of the shifting rod 310b and pushes the shifting rod 310b to the right. When this is completed, the second gear position has been achieved.

Figure 14:
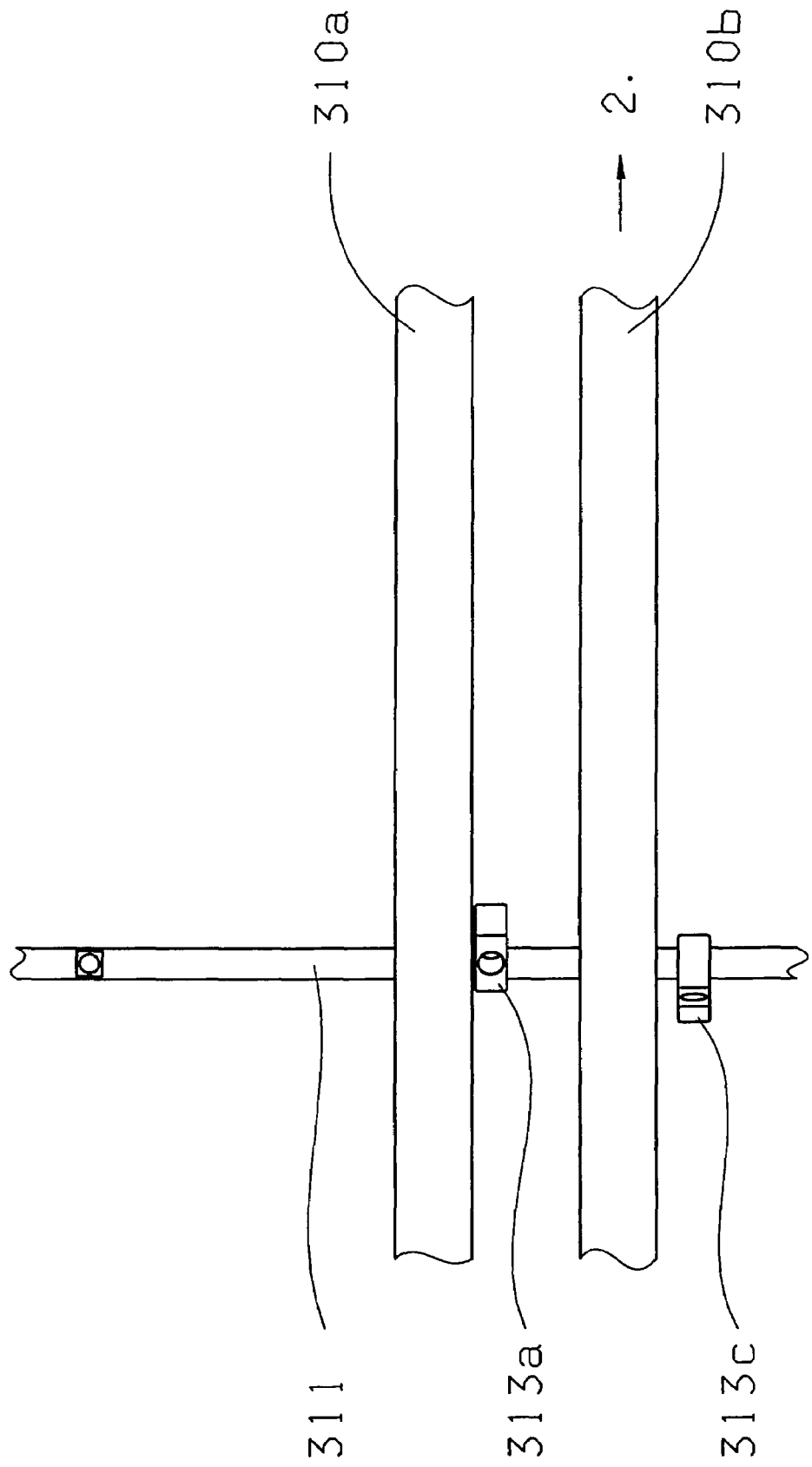

In the case of the shown positions of the shifting finger shaft 311 in the FIGS. 14, 15, the shifting fingers 313a and 3113c are not engaged.

In the case of all the embodiments of the invented shifting apparatuses shown here, the application thereof, is in accord with the invention, in that the shifting fingers, must be slidingly moved in the same direction in accord with the shifting positions of gear stages as laid out on a shifting path pattern within the transmission either coacting with shifting rods installed on opposite sides of a shifting finger shaft, or the finger fingers must be installed on different, shifting finger shafts, which shafts are bound together by an inversion apparatus. Should the sliding displacement directions of the pattern indicate running in counter directions, then the shifting-means must be displaced, with one or various shifting fingers of the same shifting finger shaft.

| Reference numerals | |
|---|---|
| 1 | Transmission for motor vehicle |
| 2 | shifting packet |
| 3 | ratio stage |
| 4 | gear shift lever |
| 5 | shift-path |
| 6 | shifting pattern |
| 7 | selected path |
| 8 | conversion apparatus |
| 9 | shifting-means |
| 10 a, b, c, d | shifting rod |
| 11 | shift-finger shaft |
| 12 | another shift-finger shaft |
| 13 a to h | shift-finger |
| 14 | toothed segment |
| 15 | rack |
| 16 | doble clutch |
| 17 | hollow shaft |
| 18 | solid shaft |
| 19 a, b, c, d | free gear |
| 20 a, b, c, d | fixed gear |
| 21 | counter shaft |
| 23 | shifting compartment |
| 24 | toothed gear |
| 25 | toothed gear |
| 26 | guide element |
| 27 a to h | shift-groove |
| 104 | Gear shift lever |
| 105 | shift-path direction |
| 107 | selected path direction |
| 108 | conversion apparatus |
| 110 a, b, c, d | shifting rod |
| 111 | shift-finger shaft |
| 112 | shift-finger shaft |
| 113 a, b | shift-finger |
| 114 | frame |
| 115 | rotational bearing |
| 116 a, b | shifting extension |
| 117 | groove(s) |
| 118 | guide element |
| 119 | shaft(s) |
| 124 | lever |
| 125 | lever |
| 126 | groove |
| 127 a, b | shift-groove |
| 128 a, b | shifting extension |
| 213 | shift-finger |
| 216 a, b | shifting extension |
| 227 a, b | shift-groove element |
| 228 a to d | shift-groove(s) |
| 229 | transverse groove |
| 230 | shifting lifter |
| 308 | conversion apparatus |

-continued

| Reference numerals | |
|---|---|
| 310 a to d | shifting rod |
| 311 | shift-finger shaft |
| 313 a to d | shift-finger(s) |
| 327 a to h | shift-groove(s) |
| A, B, C | views |

The invention claimed is:

1. A manually controlled shifting conversion apparatus for a multistage transmission, the manually controlled shifting conversion apparatus comprising a plurality of shifting packets (2),
wherein each shifting packet (2) includes gears (1', 3'/2', 4'/5', 7'/6', R) for successive, non-adjacent gear ratios; and
gears for successive, adjacent gear ratios are located in different shifting packets;
in each shifting packet, the gears located in the shifting packet are respectively engaged by opposing axial displacements of the shifting packet gears by axial motion of a shifting rod (310) coupled with a corresponding pivoting shifting finger (313) mounted on a shifting finger shaft (311) controlled by a gear shift lever (4); and
the gear shift level (4) has a shifting pattern in which the shifting positions of successive gear ratios are located in opposing positions in the shifting pattern.

2. The shifting apparatus according to claim 1, wherein between the gear shift lever (4) and the at least one shifting packet (2) a conversion apparatus (8) is provided which converts a motion of the gearshift lever (4) into a motion of a shifting-means which achieves one of a stage (3) corresponding to the shifted gear.

3. The shifting apparatus according to claim 1, wherein the conversion apparatus (8) is one of a direct or an indirect connection between the gear shift lever (4) and the at least one shifting packet (2).

4. The shifting apparatus according to claim 1, wherein the conversion apparatus (8) is one or more of mechanical, hydraulic or pneumatic connection.

5. The shifting apparatus according to claim 1, wherein a shifting pattern (6) is assigned to the gear shift lever (4), which is designed with an H or multiple H patterns, wherein, in shifting positions, neighboring ratio stages essentially lie opposite to one another.

6. The shifting apparatus according to claim 1, wherein within one shifting path (5) successively following ratio stages of the transmission (1) can be shifted by the gear shift lever (4), whereby at least one of ratio stage (3) is shifted by the shifting packet (2), to which two non-successively following stages (3) are assigned.

7. The shifting apparatus according to claim 1, wherein each shifting path (5) is assigned at least two shifting packets (2).

8. The shifting apparatus according to claim 1, wherein upon the sliding movement of the gear shift lever (4) in at least one selective path (7) of the shifting pattern (6) at least two shifting packets (2) are simultaneously bound together with the gear shift lever (4) by the shifting-means (9).

9. The shifting apparatus according to claim 1, wherein conversion apparatus contains an inversion apparatus, by which, a shifting movement in a shifting path of the gear shift lever (4) produces a corresponding movement in a shifting-means.

10. The shifting apparatus according to claim 9, wherein to a shifting finger shaft (11) at least one additional shifting finger shaft (12) is coupled.

11. The shifting apparatus according to claim 10, wherein placement of the shifting finger shafts (11, 12) is in one or more planes.

12. The shifting apparatus according to claim 9, wherein shifting finger shafts (11, 12) are coupled together so that for each gear ratio selection position of the gear shift lever (4) the gear shift lever (4) axially engages at least one shifting finger shaft (11, 12) and during a change of the gear shift lever (4) from a first gear ratio selection position to a second gear ratio selection position, the gear shift lever (4) rotates adjacent shifting finger shafts (11, 12) in opposite directions.

13. The shifting apparatus according to claim 1, wherein the gear shift lever (4) is connected with a shifting finger shaft (11) and the shaft is made axially slidable and radially pivotal by the gear shift lever (4).

14. The shifting apparatus according to claim 13, wherein the gear shift lever is rigidly bound to the shifting finger shaft (311).

15. The shifting apparatus according to claim 1, wherein shifting finger shafts (11, 12) are assigned to at least one shifting finger (13).

16. The shifting apparatus according to claim 15, wherein in at least one shifting path (5), at least two shifting fingers (13) of different shifting finger shafts (11, 12) engage in different shifting rods (10).

17. The shifting apparatus according to claim 15, wherein in at least one shifting path (5) at least two shifting fingers (13) of the same shifting finger shaft (11, 12) engage in different shifting rods (10).

18. The shifting apparatus according to claim 1, wherein upon rotation of a shifting finger shaft (11), at least one shifting finger (13) of the shifting finger shaft (11, 12) is brought out of engagement with a one shifting rod (10), and at least another shifting finger (13) of the other shifting finger shaft (12, 11) slidingly displaces the other shifting rod (10).

19. The shifting apparatus according to claim 18, wherein upon rotation of the shifting finger shaft (11) in the reverse/inverse rotational direction, the at least one shifting finger (13) of the other shifting finger shaft (12, 11) is brought out of engagement with the other shifting rod (10) and the at least one shifting finger (13) of the other shifting finger shaft (11, 12) slidingly pushes the one shifting rod (10).

20. The shifting apparatus according to claim 1, wherein upon rotation of a shifting finger shaft (11) in one rotational direction, at least one shifting finger (13) of the shifting finger shaft (11, 12) is brought out of engagement with a shifting rod (10) and at least one other shifting finger (13) of the shifting finger shaft (11, 12) slidingly displaces another shifting rod (10).

21. The shifting apparatus according to claim 1, wherein upon rotation of a shifting finger shaft (11) in both rotational directions, at least one shifting finger (13) of one shifting finger shaft (11, 12) slidingly pushes a shifting rod (10).

22. The shifting apparatus according to claim 1, wherein contours of shifting rods (10) are designed in such that the shifting rods (10) is shifted into a either a shifting position or into a neutral position by a shifting finger (13).

23. The shifting apparatus according to claim 1, wherein a contour of a shifting finger (13) is designed so that a torque ratio is achieved by the contour.

24. The shifting apparatus according to claim 1, wherein upon sliding displacement of the gear shift lever (4) in a selection path (7) of the shifting pattern (6), at least two shifting packets (2) are actuated by shifting extensions which are bound to the shifting packets.

25. The shifting apparatus according to claim 1, wherein an inversion apparatus consists of essentially a shifting finger shaft (311) and a plurality of shifting rods (310), whereby the shifting finger shaft (311) is placed essentially at right angles to the shifting rods (310).

26. The shifting apparatus according to claim 25, wherein the plurality of shifting rods (310) are placed in essentially two planes on oppositely disposed sides of the shifting finger shaft (311).

27. The shifting apparatus according to claim 25, wherein on the shifting finger shaft (311), shift fingers (313) are provided which coact with shifting grooves (327) in the shifting rods (310).

28. The shifting apparatus according to claim 1, wherein a shifting finger (313) is placed on a shift finger shaft (311) such that the shifting finger (313), when in a neutral position, is at an angle with respect to the to shifting rods (310).

29. The shifting apparatus according to claim 28, wherein for achieving of a gear by activation of a corresponding shifting lever, the corresponding shifting finger (313) is pivotally placed in a position which is essentially perpendicular to the shifting rod (310).

30. The shifting apparatus according to claim 28, wherein the concerned shifting finger (313) upon pivoting in one direction, activates the shifting rod (310) upon the pivoting of the shifting finger (313) in an opposite rotational direction, the shifting finger (313) becomes free and the shifting rod (310) is not activated, whereby the shifting rod (310) is kinematically coupled with the shifting finger (313) until the neutral position is once again reached.

31. The shifting apparatus according to claim 1, wherein a shifting finger (313) is provided for engagement and de-engagement of a gear.

32. The shifting apparatus according to claim 1, wherein a shifting finger (313) is provided for activation of the shifting packet and engagement and de-engagement of two gears, which allows four gears to be shifted by two shifting fingers (313).

33. The shifting apparatus according to claim 1, wherein a conversion apparatus contains slidable shifting collars slidingly mounted on fixed shifting rods.

34. The shifting apparatus according to claim 1, wherein the shifting apparatus is hand controlled.

35. The motor vehicle transmission according to claim 1, wherein the transmission contains a double clutch gear train with only one startup clutch (22).

36. The motor vehicle transmission according to claim 1, wherein the transmission is designed as a heavy duty truck transmission.

37. The motor vehicle transmission according to claim 1, wherein the transmission is designed as a group-transmission.

38. The motor vehicle transmission according to claim 1, wherein the transmission is manually shifted.

39. A shift mechanism for a multistage transmission wherein, in the transmission, two non-consecutive ratio stages are assigned to at least one shift packet and a shift lever is provided for actuation for the shift packets, and a shift pattern is assigned to the shift lever in which shift positions of each two consecutive gears are opposite each other in shift tracks, and the gears that are selectable within a shift track are assigned to different shift packets, the shift lever (4) is connected to a shift-finger shaft (11, 311), and this shift-finger shaft can be displaced axially and pivoted radially by the shift lever (4), and at least one shift finger (13, 313) is assigned to the shift-finger shaft (11, 12, 311), and the shift finger (13, 313) is disposed on the shift-finger shaft (11, 12, 311) such that, in a neutral position, the shift finger (13, 313) does not extend perpendicularly relative to a shift rod (310), and the respective shift finger (313), upon swivelling in one direction, actuates the shift rod (310) and the shift packet and, upon swivelling of the shift finger (313) in the opposite direction, the shift finger (313) becomes free and does not actuate the shift rod (310), the shift rod (310) being kinematically coupled to the shift finger (313) until the neutral position is again attained.

* * * * *